United States Patent
Yang

(10) Patent No.: US 8,866,875 B2
(45) Date of Patent: Oct. 21, 2014

(54) METHOD AND APPARATUS FOR CONTROLLING A CONFERENCE PLACE ENVIRONMENT IN VIDEO COMMUNICATION

(75) Inventor: Haiyao Yang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 238 days.

(21) Appl. No.: 13/458,645

(22) Filed: Apr. 27, 2012

(65) Prior Publication Data

US 2012/0212572 A1 Aug. 23, 2012

Related U.S. Application Data

(63) Continuation of application No. PCT/CN2010/078139, filed on Oct. 27, 2010.

(30) Foreign Application Priority Data

Oct. 28, 2009 (CN) .......................... 2009 1 0208524

(51) Int. Cl.
*H04N 7/15* (2006.01)
*H04N 7/14* (2006.01)
*H05B 37/02* (2006.01)

(52) U.S. Cl.
CPC ........... *H04N 7/142* (2013.01); *H05B 37/0245* (2013.01)
USPC ........... 348/14.08; 348/14.1; 353/69; 353/37; 353/50; 353/70; 345/207

(58) Field of Classification Search
USPC ............ 348/14.08, 14.01, E07.083; 345/207; 356/69
See application file for complete search history.

(56) References Cited

U.S. PATENT DOCUMENTS

| 5,206,721 A | 4/1993 | Ashida et al. |
| 2007/0046901 A1* | 3/2007 | Kuno .............................. 353/69 |
| 2009/0146982 A1 | 6/2009 | Thielman et al. |

FOREIGN PATENT DOCUMENTS

| CN | 1553353 A | 12/2004 |
| CN | 1924886 A | 3/2007 |
| CN | 101035224 A | 9/2007 |
| CN | 101753851 A | 6/2010 |
| WO | WO 2007/130641 A2 | 11/2007 |

OTHER PUBLICATIONS

Office Action issued in corresponding Chinese Patent Application No. 200910208524.9, mailed Nov. 1, 2012.

(Continued)

*Primary Examiner* — Joseph J Nguyen
(74) *Attorney, Agent, or Firm* — Brinks Gilson & Lione

(57) ABSTRACT

Embodiments of the present invention disclose a method and an apparatus for controlling a conference place environment in video communication, in which, the method for controlling a video communication conference place environment includes: generating illumination feedback information indicating an illumination effect of a video communication conference place, in which the illumination feedback information comprises: a parameter indicating an illumination flaw or a parameter indicating correction of the illumination flaw; and outputting the illumination feedback information, so that a lighting controlling device in the video communication conference place controls lighting in the video communication conference place according to the illumination feedback information. By use of technical solutions provided by the embodiments of the present invention, a conference place environment in video communication is able to be remotely controlled.

10 Claims, 15 Drawing Sheets

---

Generate illumination feedback information indicating an illumination effect of a video communication conference place, which includes: a parameter indicating an illumination flaw or a parameter indicating correction of the illumination flaw — 101

Output the illumination feedback information, so that a lighting controlling device in the video communication conference place controls lighting in the video communication conference place according to the illumination feedback information — 102

(56) References Cited

OTHER PUBLICATIONS

Extended European Search Report issued in corresponding European Patent Application No. 10826081.1, mailed May 27, 2013.

International Search Report and Written Opinion of the International Searching Authority issued in corresponding PCT Patent Application No. PCT/CN2010/078139, mailed Feb. 24, 2011.

* cited by examiner

METHOD AND APPARATUS FOR CONTROLLING A CONFERENCE PLACE ENVIRONMENT IN VIDEO COMMUNICATION

CROSS-REFERENCE TO RELATED APPLICATIONS

This application is a continuation of International Application No. PCT/CN2010/078139, filed on Oct. 27, 2010, which claims priority to Chinese Patent Application No. 200910208524.9, filed on Oct. 28, 2009, both of which are hereby incorporated by reference in their entireties.

FIELD OF THE INVENTION

The present invention relates to the field of communications technologies, and in particular, to a method and an apparatus for controlling a conference place environment in video communication.

BACKGROUND OF THE INVENTION

A telepresence (Telepresence) system is a video conference system for creating a virtual conference environment, and the created virtual conference environment fully embodies human-centered factors of a conference participant, and replicates real experience of the conference participant as much as possible. Relative to a conventional video conference system, the Telepresence system has advantages including: an image of a real person size, fluent motion, precise limb behavior, a high-definition studio-level video, approximate eye contact of a large user group, and so on. Therefore, the Telepresence system is capable of greatly improving user acceptability, thereby increasing a use rate and improving user satisfaction.

In a video conference system such as telepresence (Telepresence), a lighting engineer manually adjusts a lighting controlling device so that lighting of a video communication conference place is adjusted in place at one go, a camcorder shoots the video communication conference place, and an image is transmitted to another video communication conference place, so that users in the two conference places are capable of performing video communication. Disadvantages in the prior art are as follows: Because the lighting controlling device is manually adjusted by the lighting engineer, in a case of dim lighting, character skin color distortion, white balance maladjustment, and so on, the lighting controlling device cannot be adjusted in time, and therefore an illumination flaw cannot be corrected in time, so that an effect of the image shot by the camcorder is bad.

Deployments of existing Telepresence systems are substantially the same at all conference places of a conference. For example, the conference place environments are all in a background of dark brown tables and chairs, black leather chairs, and white or blue walls. Disadvantages in the prior art are as follows: When expressing different atmospheres such as festivity, sadness, and oppression, people intend to adopt different conference place deployments, but in the prior art, deployments of all conference places are substantially the same, and therefore, it is unfavorable to deploy different conference place environments for different conferences.

SUMMARY OF THE INVENTION

Embodiments of the present invention provide a method and an apparatus for controlling a conference place environment in video communication, which are capable of remotely controlling and deploying a conference place environment in video communication.

Accordingly, embodiments of the present invention provide the following:

A method for controlling a video communication conference place environment, which includes:

generating illumination feedback information indicating an illumination effect of a video communication conference place, in which the illumination feedback information includes: a parameter indicating an illumination flaw or a parameter indicating correction of the illumination flaw; and outputting the illumination feedback information, so that a lighting controlling device in the video communication conference place controls lighting in the video communication conference place according to the illumination feedback information.

A method for controlling a video communication conference place environment, which includes:

receiving, by a first terminal, information about a video communication conference place environment supported by a second terminal;

selecting a video communication conference place environment used by the second terminal according to the information about the video communication conference place environment supported by the second terminal; and sending information about the selected video communication conference place environment to the second terminal.

An apparatus for controlling a video communication conference place environment, which includes:

a generating unit, configured to generate illumination feedback information indicating an illumination effect of a video communication conference place, in which the illumination feedback information includes: a parameter indicating an illumination flaw or a parameter indicating correction of the illumination flaw; and a sending unit, configured to output the illumination feedback information, in which the illumination feedback information is a basis on which a lighting controlling device in the video communication conference place controls lighting of the video communication conference place.

An apparatus for controlling a video communication conference place environment, in which the apparatus for controlling a video communication conference place environment is located on a first terminal, and includes:

a receiving unit, configured to receive information about a video communication conference place environment supported by a second terminal; and a selecting unit, configured to select a video communication conference place environment used by the second terminal according to the information about the video communication conference place environment supported by the second terminal.

In the embodiments of the present invention, illumination feedback information is generated to control lighting in a video communication conference place, or a video communication conference place environment of a peer is determined according to the information about the video communication conference place environment supported by the peer, thereby achieving an objective of changing the video communication conference place environment and improving user satisfaction.

BRIEF DESCRIPTION OF THE DRAWINGS

In order to make the technical solutions of the present invention clearer, the accompanying drawings for illustrating the embodiments of the present invention are described briefly below. Evidently, the accompanying drawings illustrate only some embodiments of the present invention, and those of ordinary skill in the art can derive other accompanying drawings from these accompanying drawings without any creative effort.

DETAILED DESCRIPTION OF THE EMBODIMENTS

The technical solutions of the embodiments of the present invention are clearly and completely described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

In order to clearly illustrate the embodiments of the present invention, the following terms are illustrated:

A local conference place, a local end for short, is a conference place where a current conference participant is located.

A remote conference place, a remote end for short, is a conference place in video communication with the local conference place.

A peer conference place, a peer end for short, is another conference place in communication with the local conference place; for two conference places in a point-to-point communication manner, a conference place is a peer conference place of another conference place; other conference places in communication with the local conference place in a point-to-multipoint communication manner are all called peer conference places.

A conference place where video communication is performed, in addition to including a conference terminal, generally further includes an image collection device (such as: a camcorder or camera) used to shoot an image of the local conference place, an audio collection device (such as: a single microphone or a microphone array) used to collect an audio signal of the local conference place, a video display device (such as: a display and a projector) used to output a peer video signal, and an audio output device (such as: a single loudspeaker or a loudspeaker array) used to output a peer audio signal.

Embodiment 1

Figure 1:
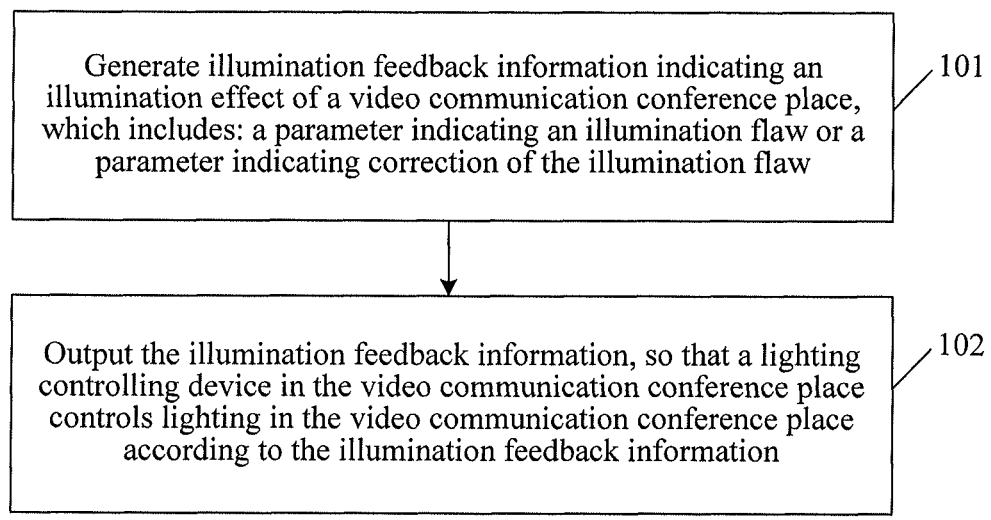
FIG. 1 is a flowchart of a method for controlling a video communication conference place environment according to embodiment 1 of the present invention.

Referring to FIG. 1, embodiment 1 of the present invention provides a method for controlling a conference place environment in video communication, in which the method includes the following steps:

101. Generate illumination feedback information indicating an illumination effect of a video communication conference place, in which the illumination feedback information includes: a parameter indicating an illumination flaw or a parameter indicating correction of the illumination flaw.

The generating the illumination feedback information indicating the illumination effect of the video communication conference place may have the following two implementation manners:

First implementation manner: Obtain an image of the video communication conference place shot by an image shooting apparatus; and generate the illumination feedback information according to the obtained image.

Specifically, in this step, the image obtained by a terminal may be an image of a local video communication conference place shot by a local image shooting apparatus, or may be an image of a remote video communication conference place shot by a remote image shooting apparatus; if the image of the remote video communication conference place is shot, the image is collected by the remote image shooting apparatus and then transmitted to a remote terminal, and the remote terminal transmits the image to a local terminal through a video communication transmission network.

In this step, a conference terminal analyzes the obtained image, and generates the illumination feedback information according to an image analysis result. If it is determined that a flaw of excessively strong illumination exists according to the image analysis result, the illumination feedback information includes: a parameter indicating excessively strong illumination or a parameter indicating reduction of lighting illuminance; if it is determined that a flaw of excessively weak illumination exists according to the image analysis result, the illumination feedback information includes: a parameter indicating excessively weak illumination or a parameter indicating increase of lighting illuminance; if it is determined that a flaw of an excessively high color temperature exists according to the image analysis result, the illumination feedback information includes: a parameter indicating the excessively high color temperature or a parameter indicating reduction of the color temperature; if it is determined that a flaw of an excessively low color temperature exists according to the image analysis result, the illumination feedback information includes: a parameter indicating the excessively low color temperature or a parameter indicating increase of the color temperature; if it is determined that a flaw of an excessively fast flicker frequency exists according to the image analysis result, the illumination feedback information includes: a parameter indicating the excessively fast flicker frequency or a parameter indicating reduction of the flicker frequency; if it is determined that a flaw of an excessively slow flicker frequency exists according to the image analysis result, the illumination feedback information includes: a parameter indicating the excessively slow flicker frequency or a parameter indicating increase of the flicker frequency.

The analyzing the obtained image by the conference terminal includes, but is not limited to, the following several manners:

(1) By use of pre-stored image statistics data, parameter extraction is performed on the obtained image, and extracted parameters are analyzed and determined; these parameters include, but are not limited to, parameters such as illumination strength, a color temperature, and a flicker frequency; for example: for images of different environments, different parameter values of are obtained through statistics in advance, and by use of the statistics parameter values as a determining standard, the parameters extracted according to the obtained image are determined.

(2) The obtained image is calculated by use of an objective image evaluation formula, and then a calculation result is used to be compared with an objective image evaluation standard, thereby implementing an analysis of the obtained image.

For a specific implementation manner of determining existence of an illumination flaw according to the image analysis result, reference is made to subsequent detailed introduction of embodiment 2 of the present invention.

Second implementation manner: Obtain a result of detection performed by an illumination sensor on the lighting in the video communication conference place, and generate the illumination feedback information according to the detection result. The specific content of the illumination feedback information thereof is similar to that described in the first implementation manner, which is not repeated herein.

102. Output the illumination feedback information, so that a lighting controlling device in the video communication conference place controls lighting in the video communication conference place according to the illumination feedback information.

A specific implementation manner in which the lighting controlling device in the video communication conference place controls the lighting in the video communication conference place according to the illumination feedback information may be that: the lighting controlling device in the video communication conference place controls an illumination parameter of an illumination luminaire according to illumination feedback information, which include, but are not limited to: controlling brightening or darkening of the lighting in the video communication conference place (that is, increasing or reducing the lighting illuminance), increasing or reducing the color temperature, and increasing or reducing the flicker frequency.

If in the first implementation manner, the image obtained by the terminal is the image of the local video communication conference place shot by the local image shooting apparatus, in this step, the local conference terminal sends an illumination feedback signal to the lighting controlling device in the local video communication conference place.

Through the preceding implementation manner, the local conference terminal is enabled to determine an adjustment parameter of an illumination apparatus according to the effect of the image shot by the image shooting apparatus of the local conference place, and then the illumination is adjusted through a local lighting controlling device.

If in the first implementation manner, the image obtained by the terminal is the image of the remote video communication conference place shot by the remote image shooting apparatus, in this step, the local terminal feeds back the illumination feedback information to a remote lighting controlling device through the video communication network so as to control an illumination device of the remote conference place.

Through the preceding implementation manner, the local conference terminal is enabled to obtain the image shot by the image shooting apparatus of the remote conference place, and then determine the illumination feedback information according to the image, so that the remote lighting controlling device adjusts a remote illumination device according to the illumination feedback information.

In embodiment 1 of the present invention, a terminal generates illumination feedback information indicating an illumination effect of a video communication conference place and sends the illumination feedback information to a lighting controlling device in the video communication conference place, and the illumination feedback information carries a parameter indicating an illumination flaw or a parameter indicating correction of the illumination flaw, so that the lighting controlling device is capable of controlling the lighting according to the illumination feedback information, and solving the illumination flaw in time.

Embodiment 2

Figure 2A:
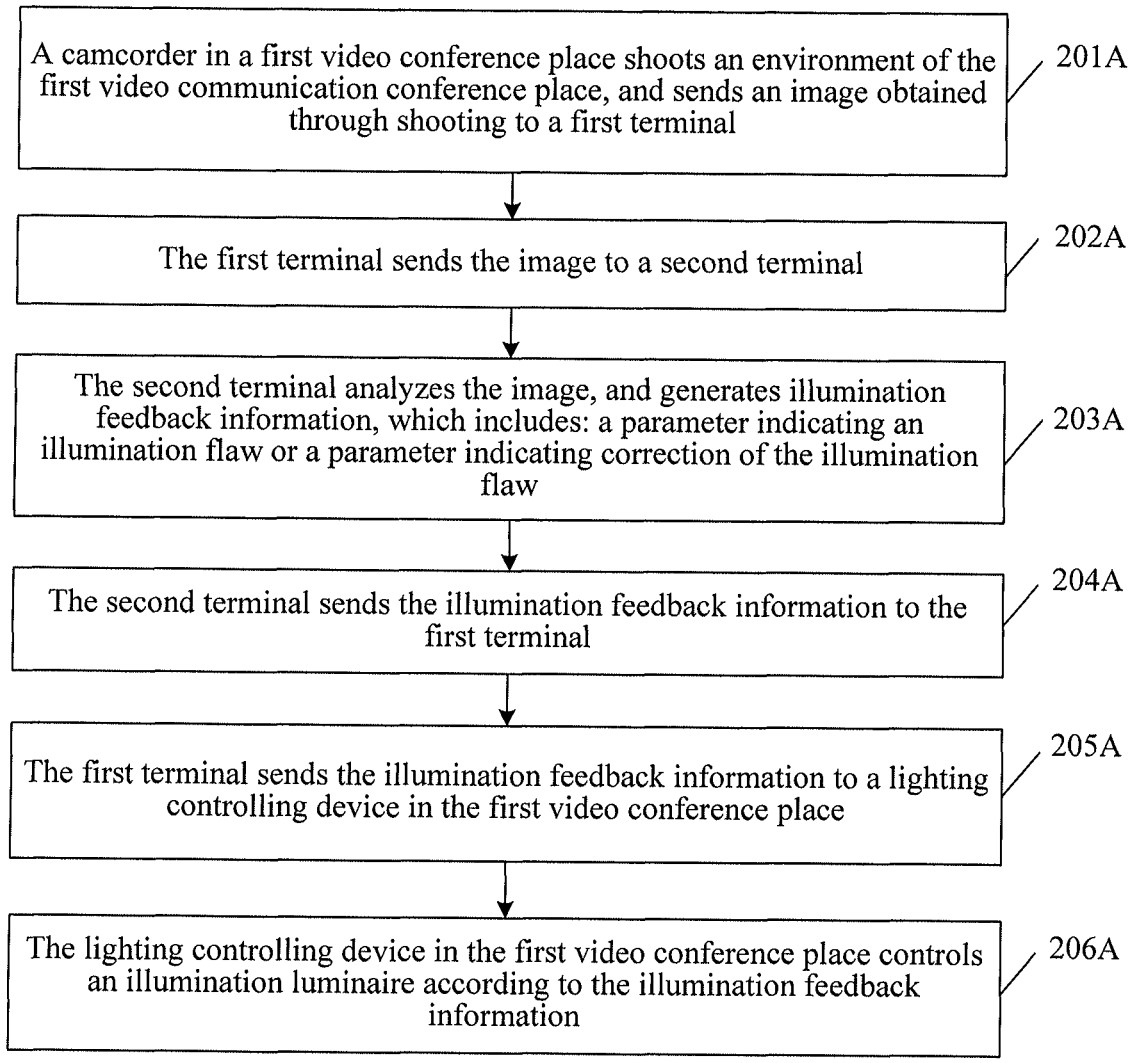
FIG. 2A is a flowchart of a method for controlling a video communication conference place environment according to embodiment 2 of the present invention.
Figure 2B:
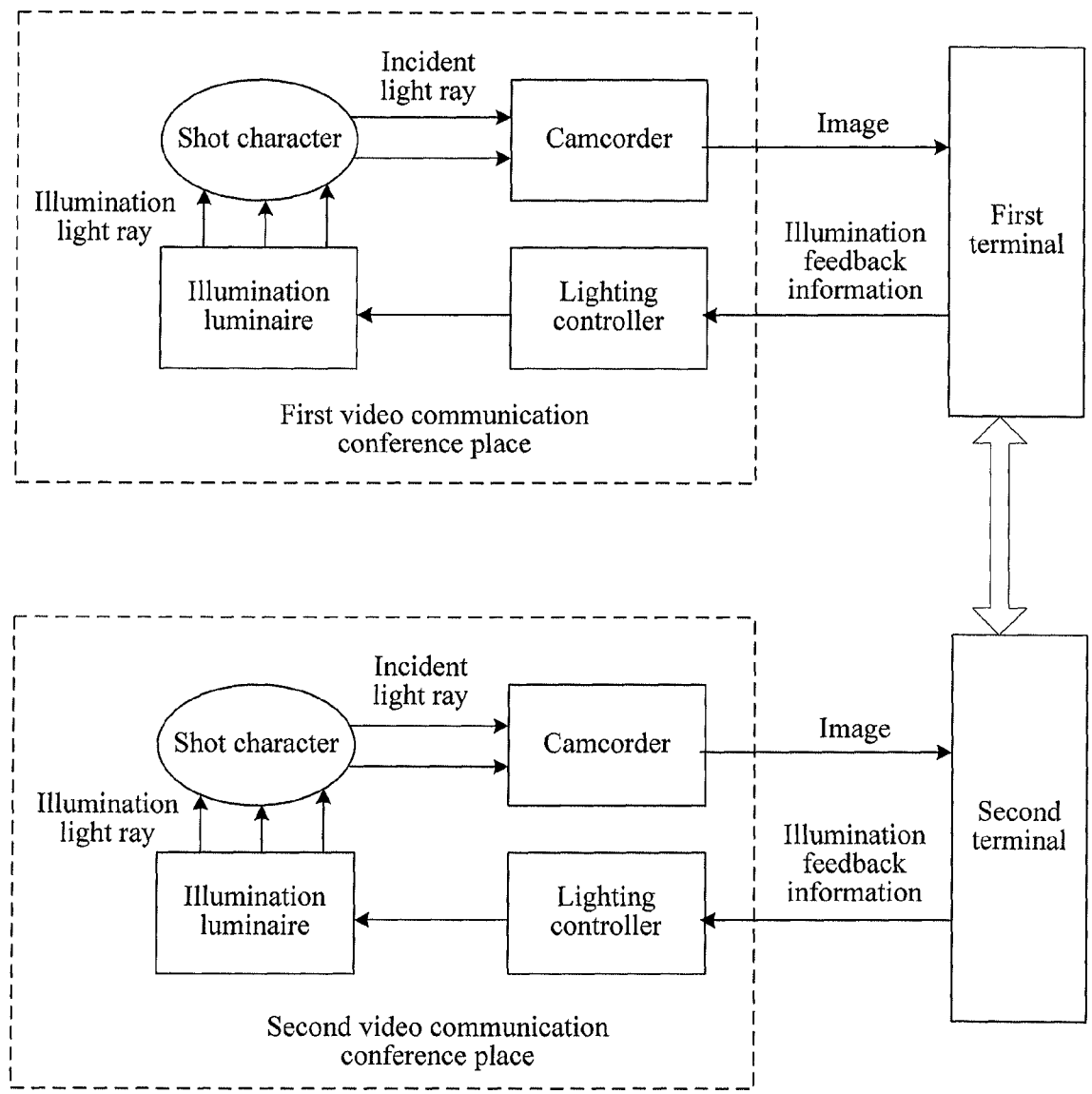
FIG. 2B is a schematic diagram of controlling a video communication conference place lighting environment according to embodiment 2 of the present invention.

Referring to FIG. 2A and FIG. 2B, embodiment 2 of the present invention provides a method for controlling a conference place environment in video communication, in which the method includes the following steps:

201A. A camcorder in a first video communication conference place shoots an environment of the first video communication conference place, and sends an image obtained through shooting to a first terminal.

The camcorder in this embodiment and each of subsequent embodiments of the present invention shoots a video communication conference place environment, obtains stable and continuous data frames and outputs the data frames to a local terminal. The camcorder itself also performs particular compensation on an illumination condition of the shot image. For example, the camcorder may automatically enlarge an aperture, increase an aperture stop, increase exposure time, calibrate a color, turn on a self-carried fill light, and so on. However, a capability of the camcorder image for compensating the illumination condition of the shot image is limited.

Therefore, if the illumination condition is not good, an effect of the image obtained by the camcorder through shooting may be bad.

The camcorder in this embodiment and each of subsequent embodiments of the present invention may output the data frames to the terminal through various output interfaces, such as IEEE1394, HD-SDI, CVBS, S-Video, YPbPr, and so on.

202A. The first terminal sends the image to a second terminal through a video communication channel in a network.

203A. The second terminal analyzes the image, and generates illumination feedback information, in which the illumination feedback information includes: a parameter indicating an illumination flaw or a parameter indicating correction of the illumination flaw.

The specific implementation procedure of this step includes, but is not limited to, the following several solutions:

1) The second terminal obtains a parameter denoting image brightness, and determines whether the parameter denoting image brightness is greater than a first threshold, and if yes, it is denoted that illumination of the image is excessively strong; and determines whether the parameter denoting image brightness is smaller than a second threshold, and if yes, it is denoted that the illumination of the image is insufficient; when determining that the parameter denoting the image brightness is greater than the first threshold, the second terminal determines that the illumination is excessively strong, and generates a parameter indicating excessively strong illumination or a parameter indicating reduction of lighting illuminance; and when determining that the parameter denoting the image brightness is smaller than the second threshold, the second terminal determines that the illumination is excessively weak, and generates a parameter indicating excessively weak illumination or a parameter indicating increase of lighting illuminance.

This part may be executed by an illumination contrast check module in the terminal.

It may be first determined whether the parameter denoting image brightness is greater than the first threshold, and if not, it is then determined whether the parameter denoting image brightness is smaller than the second threshold; or, it is first determined whether the parameter denoting image brightness is smaller than the second threshold, and if not, it is then determined whether the parameter denoting image brightness is greater than the first threshold; or, the two determinations are executed simultaneously, which does not influence the implementation of the present invention.

The parameter denoting image brightness may be an illumination contrast, or a gamma GAMMA curve coefficient; when the illumination contrast is used as the parameter denoting image brightness, both a value of the first threshold and a value of the second threshold are different from those when the GAMMA curve coefficient is used as the parameter denoting image brightness image; specific values of the first threshold and the second threshold may be determined by a technician of the field according to experience.

For example, when the GAMMA curve coefficient is used as the parameter denoting image brightness, the first threshold thereof may be 0.5, and the second threshold thereof may be 0.4.

2) The second terminal determines whether a color shift occurs in a background color of the image, and if yes, determines an illumination flaw causing the color shift occurring in the background color of the image, and generates a parameter indicating the illumination flaw or a parameter indicating correction of the illumination flaw.

This part may be executed by an image shooting color shift check module in the terminal.

The illumination flaw causing color shift occurring in the background color may be taken into account from the following two aspects: lighting illuminance and a color temperature. For example: 1. When the background of the shot image contains a faint yellow, faint red or faint blue object, the shot image may be visually embodied in white due to excessively high illuminance of the illumination lighting, and after the image is analyzed through an image shooting offset check module in the terminal, a conclusion may be drawn that the existing excessively high illumination causes the white color, that is, illumination brightness is higher than a preset first brightness threshold, and it is required to reduce the illumination brightness of a lighting illumination system affiliated to and controlled by the corresponding terminal under the conference scenario. 2. When the background of the shot image contains a dark blue, dark purple or dark brown object, the shot image may be visually embodied in black due to excessively low illuminance of the illumination lighting, and after the image is analyzed through the image shooting offset check module in the terminal, a conclusion may be drawn that the existing excessively low illumination causes the black color, that is, the illumination brightness is lower than a preset second brightness threshold, and it is required to increase the lighting illumination brightness under this conference scenario.

It is analyzed from the image that: 1. When an RGB color value of a white object is not balanced, and is not within a predetermined value range, and the color is deviated to cyan or purple, and the RGB color value is higher than a preset first color temperature threshold, it is illustrated that a lighting color temperature is excessively high, and it is required to reduce the illumination color temperature of the lighting illumination system affiliated to and controlled by the corresponding terminal under the conference scenario. For example, an illumination lamp with the color temperature of 7200 K is replaced with an illumination lamp with the color temperature 6500 K, or an illumination lamp with a lower color temperature of 4500 K. 2. When an RGB color value of a white object is not balanced, and are not within a predetermined value range, and the color is deviated to yellow or red, and the RGB color value is lower than a preset second color temperature threshold, it is illustrated that the lighting color temperature is excessively low, and it is required to increase the illumination color temperature of the lighting illumination system affiliated to and controlled by the corresponding terminal under the conference scenario. For example, an illumination lamp with the color temperature of 2800 K is replaced with an illumination lamp with the color temperature 3200 K, or an illumination lamp with a higher color temperature of 4500 K.

3) The terminal extracts a character image from the image, and determines whether a color shift occurs in a character skin color in the character image, and if yes, determines an illumination flaw causing the color shift occurring in the character skin color, and generates a parameter indicating the illumination flaw or a parameter indicating correction of the illumination flaw.

This part may be executed by a character skin color check module in the terminal.

The illumination flaw causing color shift occurring in the character skin color may be taken into account from the following two aspects: lighting illuminance and a color temperature, and for details, reference is made to the corresponding description of the illumination flaw that a color shift occurs in the background color, which is not repeated herein.

4) Determine whether a noise exists in the image, and if yes, determine an illumination flaw causing the noise, and generate a parameter indicating the illumination flaw or a parameter indicating correction of the illumination flaw.

This part may be executed by a noise check module in the terminal.

A presentation manner of the noise in an image may be a flare or a mosaic, and the illumination flaw causing the noise is caused by the lighting illuminance. For example, when a mosaic occurs in the image, the terminal analyzes what causes the mosaic, and whether the mosaic is caused by excessively strong illumination or excessively weak illumination. If a "block effect" of a large area of a white-bright part (white mosaic) appears in the image, and a brightness gradation difference cannot be distinguished in this high brightness case (commonly called appearance of "dead white" in photography), it is denoted that this type of mosaic is caused by excessively strong illumination; if the "block effect" of a large area of a black-dark part (black mosaic) appears in the image, and the brightness gradation difference cannot be distinguished in this low brightness case (commonly called appearance of "dead black" in photography), it is denoted that this type of mosaic is caused by excessively weak illumination.

5) The second terminal determines whether a glare exists in the image, and if yes, determines an illumination flaw causing the glare, and generates a parameter indicating the illumination flaw or a parameter indicating correction of the illumination flaw.

This part may be executed by a glare check module in the terminal.

A presentation manner of the glare in the image may be diffusion of a "circular halation" around a shot object or diffusion of a "columnar light strip" brought by a shot luminaire itself, and the illumination flaw causing the glare may be taken into account from the deployment itself of the lighting illumination luminaire. For example: 1. When apparent "circular halation" diffusion appears in the shot object in the image, a direct illumination luminaire, for example, a spotlight and a projection lamp, under this scenario may be turned off, and instead, a luminaire of a floodlight type (for example, a fluorescent lamp) performs corresponding illumination, and in this way, generation of the glare is able to be prevented. 2. If the luminaire itself in the image is shot, and apparent "columnar light strip" diffusion appears, an illumination working state of this shot luminaire itself may be turned off, that is, "the illumination of this lamp is extinguished", and instead, another illumination luminaire in the conference scenario performs corresponding illumination, and in this way, the glare is prevented.

204A. The second terminal sends the generated illumination feedback information to the first terminal through a video communication channel in the network.

205A. The first terminal sends the illumination feedback information to a lighting controlling device in the first video communication conference place.

206A. The lighting controlling device in the first video communication conference place controls the illumination luminaire according to the illumination feedback information.

The illumination luminaire may include: a top illumination lamp (for example, a filament lamp, a fluorescent lamp, and a projection lamp) and/or a horizontal illumination lamp (for example, a spotlight, a wall lamp, and a fill light).

If the illumination feedback information includes a parameter indicating excessively strong illumination or a parameter indicating reduction of lighting illuminance, the lighting controlling device controls the illumination luminaire to reduce the lighting illuminance.

If the illumination feedback information includes a parameter indicating excessively weak illumination or a parameter indicating increase of lighting illuminance, the lighting controlling device controls the illumination luminaire to increase the lighting illuminance.

If the illumination feedback information includes a parameter indicating an excessively high color temperature or a parameter indicating reduction of a color temperature, the lighting controlling device controls the illumination luminaire to reduce the color temperature.

If the illumination feedback information includes a parameter indicating an excessively low color temperature or a parameter indicating increase of a color temperature, the lighting controlling device controls the illumination luminaire to increase the color temperature.

In embodiment 2 of the present invention, the second terminal image generates, according to the image of the first video communication conference place shot by the camcorder in the first video communication conference place, the illumination feedback information, and transmits the illumination feedback information to the lighting controlling device in the first video communication conference place through the first terminal, so that the lighting controlling device in the first video communication conference place is capable of controlling the lighting according to the illumination feedback information and solving the illumination flaw in time, thereby achieving an objective that the second terminal controls the lighting in the first video communication conference place.

The preceding embodiment 2 describes how the local terminal control the lighting in a remote video communication conference place, and the local terminal may also control the lighting of a local video communication conference place, in which the implementation procedure includes the following: A camcorder in the local video communication conference place shoots an environment of the local video communication conference place, and sends an image obtained through shooting to the local terminal; the local terminal analyzes the image, and generates illumination feedback information, in which the illumination feedback information includes: a parameter indicating an illumination flaw or a parameter indicating correction of the illumination flaw; the local terminal sends the illumination feedback information to a lighting controlling device in the local video communication conference place; the lighting controlling device in the local video communication conference place controls a local illumination luminaire according to the illumination feedback information. The implementation manner in which the local terminal analyzes the image and generates the illumination feedback information is the same as that in the corresponding description of step 203 in embodiment 2, and the manner in which the lighting controlling device in the local video communication conference place controls the local illumination luminaire according to the illumination feedback information is the same as that in the corresponding description of step 206 in embodiment 2, which are not repeated herein.

Embodiment 3

Figure 3A:
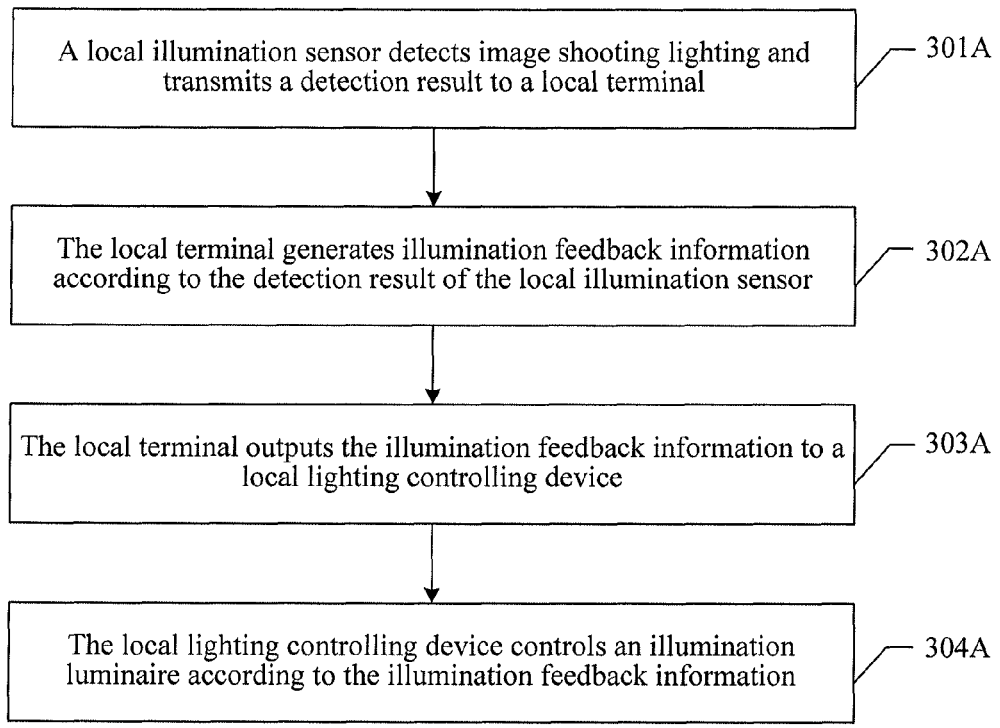
FIG. 3A is a flowchart of a method for controlling a video communication conference place environment according to embodiment 3 of the present invention.
Figure 3B:
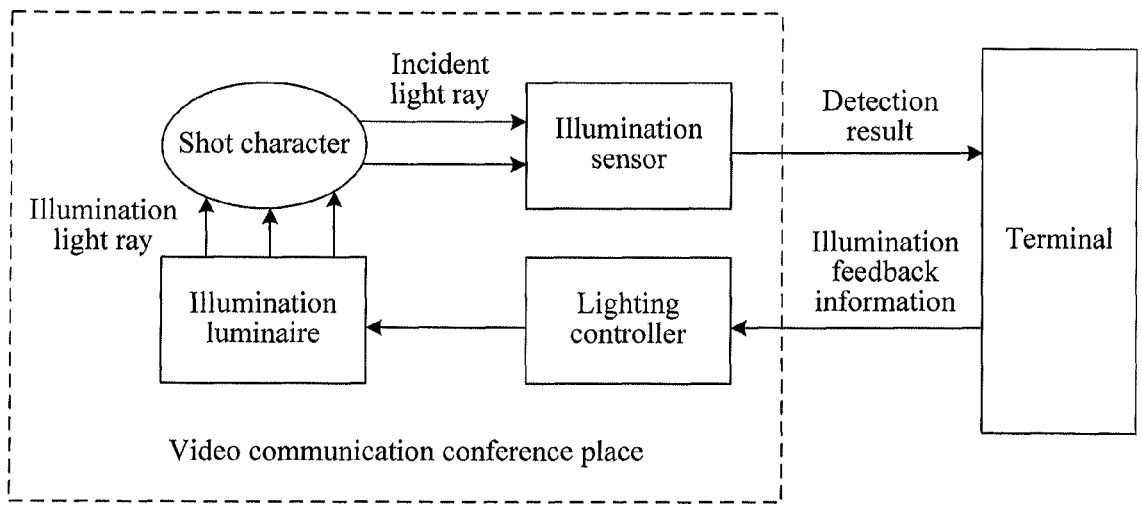
FIG. 3B is a schematic diagram of controlling a video communication conference place lighting environment according to embodiment 3 of the present invention.

Referring to FIG. 3A and FIG. 3B, embodiment 3 of the present invention provides a method for controlling a conference place environment in video communication, in the method, a local illumination sensor detects lighting, a local terminal generates illumination feedback information according to a detection result of the local illumination sensor and transmits the illumination feedback information to a local lighting controlling device, and the method specifically includes the following steps:

301A. The local illumination sensor detects lighting in a local video communication conference place, and transmits a detection result to the local terminal.

302A. The local terminal generates illumination feedback information according to the detection result of the local illumination sensor, in which the illumination feedback information includes: a parameter indicating an illumination flaw or a parameter indicating correction of the illumination flaw.

If the detection result denotes excessively strong illumination, a parameter indicating excessively strong illumination or a parameter indicating reduction of lighting illuminance is generated; if the detection result denotes excessively weak illumination, the illumination feedback information includes a parameter indicating excessively weak illumination or a parameter indicating increase of lighting illuminance; if the detection result denotes an excessively high color temperature, the illumination feedback information includes a parameter indicating the excessively high color temperature or a parameter indicating reduction of the color temperature; if the detection result denotes an excessively low color temperature, the illumination feedback information includes a parameter indicating the excessively low color temperature or a parameter indicating increase of the color temperature; if the detection result denotes an excessively fast flicker frequency, the illumination feedback information includes a parameter indicating the excessively fast flicker frequency or a parameter indicating reduction of the flicker frequency; if the detection result denotes an excessively slow flicker frequency, the illumination feedback information includes a parameter indicating the excessively slow flicker frequency or a parameter indicating increase of the flicker frequency.

303A. The local terminal outputs the illumination feedback information to the local lighting controlling device.

304A. The local lighting controlling device controls an illumination luminaire according to the illumination feedback information.

The specific manner for controlling the illumination luminaire in this step is similar to that in step 206, which is not repeated herein.

In embodiment 3 of the present invention, the local terminal generates the illumination feedback information according to the detection result of the local illumination sensor and transmits the illumination feedback information to the local lighting controlling device, in which the illumination feedback information carries a parameter indicating an illumination flaw or a parameter indicating correction of the illumination flaw, so that the lighting controlling device is capable of controlling the lighting according to the illumination feedback information, and solving the illumination flaw in time.

Embodiment 4

Figure 4A:
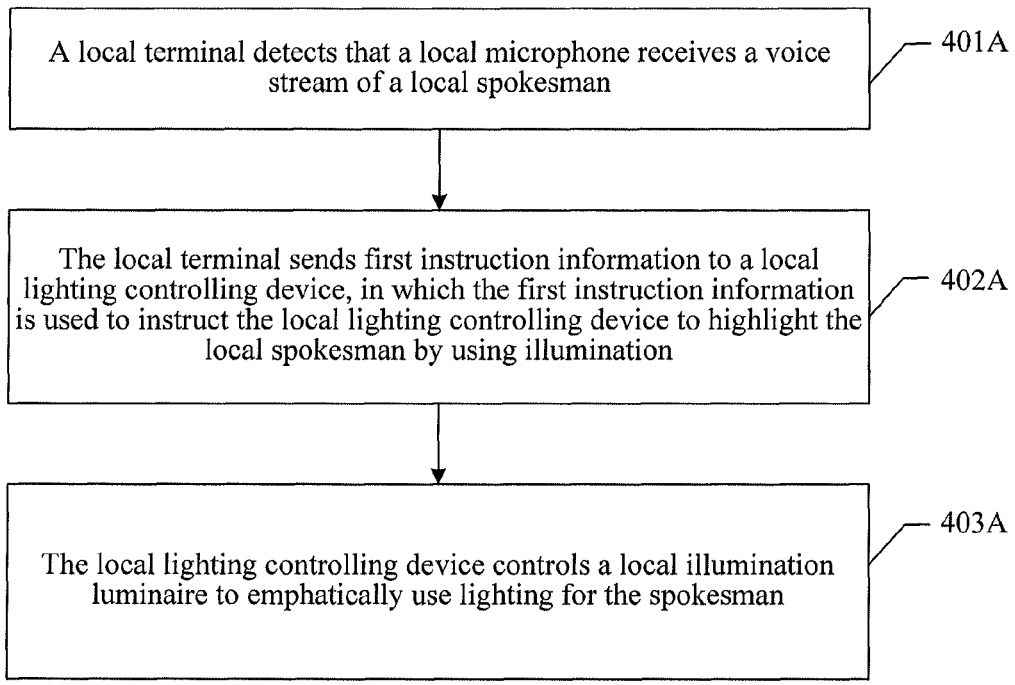
FIG. 4A is a flowchart of a method for controlling a video communication conference place environment according to embodiment 4 of the present invention.
Figure 4B:
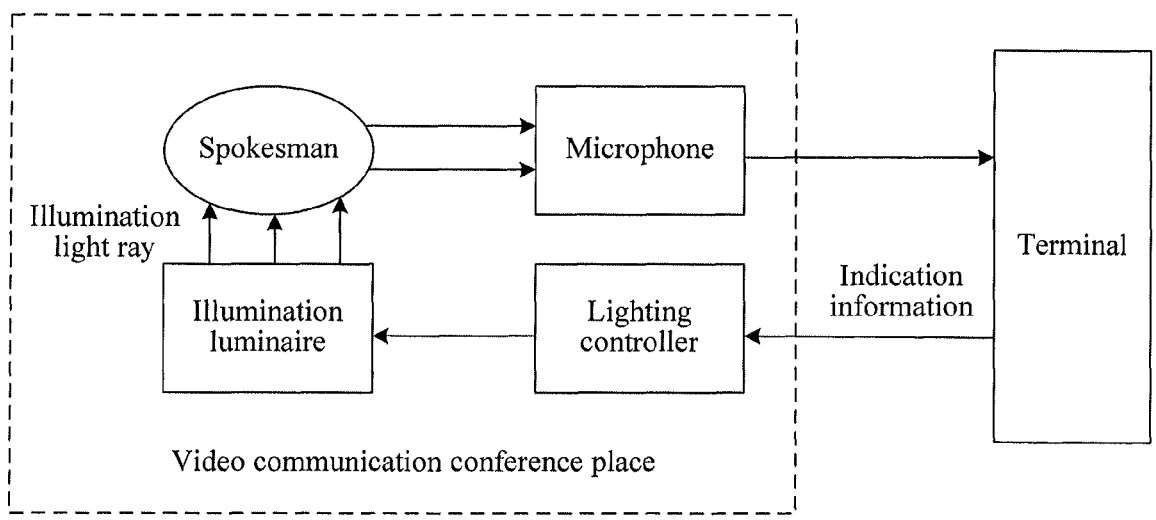
FIG. 4B is a schematic diagram of controlling a video communication conference place lighting environment according to embodiment 4 of the present invention.

Referring to FIG. 4A and FIG. 4B, embodiment 4 of the present invention provides a method for controlling a conference place environment in video communication, the method may emphatically deploy lighting for a spokesman, and the method specifically includes the following steps:

401A. A local terminal detects that a local microphone receives a voice stream of a local spokesman.

In this embodiment, a microphone is used by a conference participant, and if the conference participant speaks, in this case, the conference participant is a spokesman, and the microphone receives a voice stream of the spokesman.

It can be understood that, if a microphone array exists, and a microphone is shared by two or more conference participants, and when a participant of the conference is speaking, an orientation of the current spokesman is able to be determined through the microphone array, and then a specific position of the speaking conference participant is determined by use of known seats of conference participants.

402A. The local terminal sends first instruction information to a local lighting controlling device, in which the first instruction information is used to instruct the local lighting controlling device to highlight the local spokesman by using illumination, so that the lighting controlling device controls a local illumination luminaire to emphatically use the lighting for the spokesman.

403A. The local lighting controlling device controls the local illumination luminaire to emphatically use the lighting for the spokesman.

Specifically, the lighting controlling device controls turn-on of an overhead light above the head of the spokesman, or the lighting controlling device controls turn-on of all local overhead lights, and controls the overhead light above the head of the spokesman to emit a faint yellow halation, so as to highlight the spokesman.

It should be noted that, if two or three persons are discussing a question, the lighting controlling device controls turn-on of an overhead light above the heads of the two or three persons, or the lighting controlling device controls turn-on of all local overhead lights, and controls the overhead light above the heads of the two or three persons to emit a faint yellow halation, so as to highlight the spokesmen who are discussing the question.

In embodiment 4 of the present invention, after detecting that a local microphone receives a voice of a local spokesman, the local terminal instructs the local lighting controlling device to highlight the local spokesman by using illumination, so that conference participants are capable of definitely seeing who is speaking from a video image, thereby improving user experience.

The preceding embodiment 4 of the present invention describes that the local lighting controlling device emphatically deploys lighting for a local spokesman under an instruction of the local terminal, or the local terminal may instruct a remote lighting controlling device to emphatically deploy lighting for a remote spokesman, in which the specific implementation procedure includes the following: After the local terminal receives indication information that is sent by a remote terminal and denotes that a remote microphone receives a voice stream of a remote spokesman, the local terminal sends second instruction information to the remote lighting controlling device through the remote terminal, in which the second instruction information is used to instruct the remote lighting controlling device to highlight the remote spokesman by using illumination, and the remote lighting controlling device emphatically uses lighting for the remote spokesman according to the second instruction information, the remote lighting controlling device may adopt a manner of controlling turn-on of an overhead light above the head of the spokesman, or controlling turn-on of all overhead lights and controlling the overhead light above the head of the spokesman to emit a faint yellow halation or another manner to highlight the remote spokesman. Alternatively, after detecting that the remote microphone receives a voice of the remote spokesman, the local terminal sends the second instruction information to the remote lighting controlling device, which does not influence the implementation of the present invention.

Because light rays at positions in the video conference place are different, generally not light rays of all positions are suitable to image shooting, light rays at some positions are always strong and are suitable to image shooting, and light rays at some positions are weak and are not suitable to image shooting; after a remote user sees an image of the local video communication conference place, the image shooting effect of a part of the area is easily caused to be undesired due to reasons such as insufficient illumination, and the present invention proposes another specific implementation example, to improve this case and prevent an occurrence of this case.

It is assumed that the local conference place environment is a rectangular area, which includes a conference place front area (area A), an intermediate area (area B), and a conference place rear area (area C). (Notes: the area division herein is merely exemplary, the local conference place environment may be further divided into more and thinner image shooting areas according to a rotation angle of a camcorder.) The camcorder is mounted on a camcorder holder at a particular site (such as, in the middle of area B) and may randomly rotate, and may rotate to area A/B/C to perform image shooting as a remote conference place terminal transmits, through a communication channel, a camcorder control instruction executed by the local terminal. Generally, as far as the local conference place is concerned, it is only required that an image shooting area with which the camcorder aligns after rotation has bright or suitable illumination, and illumination of other areas may be slightly dim.

When receiving a camcorder control signal sent by the remote terminal, the local terminal controls the camcorder to be aligned with a specified image shooting area (for example, area A). In this case, the terminal of the local conference place simultaneously controls turn-on of the lighting of the area or increases the brightness, and the lighting is set to a suitable illumination brightness (an illumination luminaire of this area and the corresponding brightness thereof may be set and calibrated in advance according to engineer experience), and in this case, illumination luminaries of area B and area C may be turned off or in a low brightness. When the image shooting angle of the controlled camcorder is shifted from area A to area B to perform image shooting, the local terminal may simultaneously control turn-on of the lighting of area B or increase the brightness, and because area A is not in the image shooting area, the local terminal may simultaneously control the illumination luminaire of area A to turn off or reduce the brightness. However, because area C is not shot, area C is maintained in an original case that the luminaire is turned off or in low illuminance. By the same token, when the angle of the controlled camcorder is shifted from area B to area C to perform image shooting, the local terminal controls the illumination luminaire of area C to turn on or increase the brightness, and the illumination lighting of area A and area B is controlled by the local terminal to turn off or be in low illuminance. In this way, that the remote terminal transfers a camcorder control signal through a communication path to control rotation of the camcorder of the local terminal is completed, and an area shot by the camcorder during the rotation are all preferable lighting illumination environments.

Embodiment 5

Figure 5:
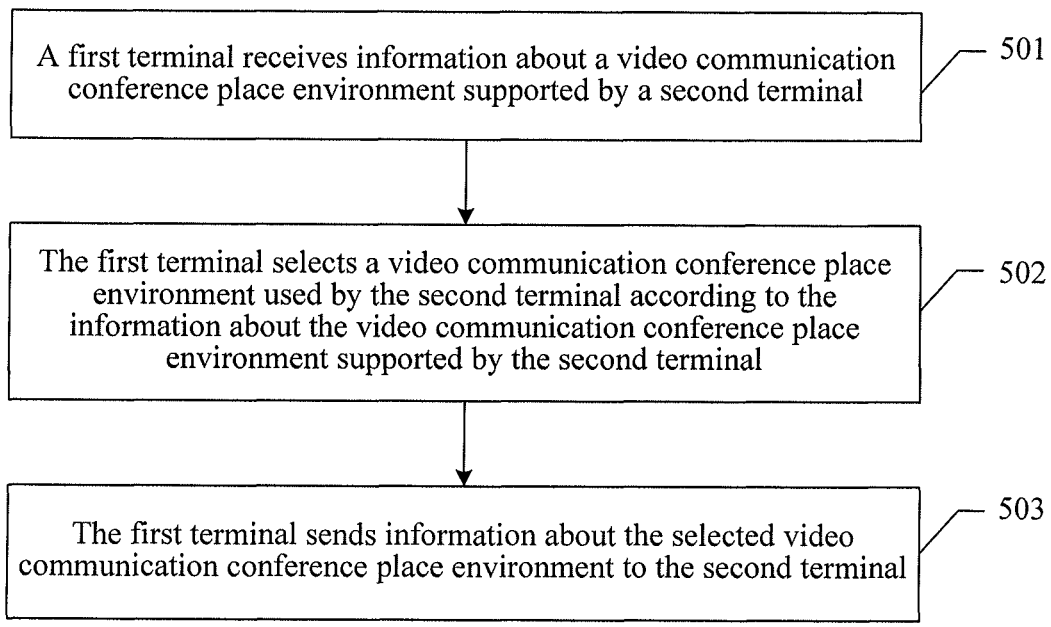
FIG. 5 is a diagram of a method for controlling a video communication conference place environment according to embodiment 5 of the present invention.

Referring to FIG. 5, embodiment 5 of the present invention provides a method for controlling a conference place environment in video communication, in which the method includes the following steps:

501. A first terminal receives parameter information of a video communication conference place environment supported by a second terminal.

The video communication conference place environment includes lighting, a background, a conference table and chair, an environment temperature, and so on, in the video communication conference place.

These video communication conference place environment factors may be denoted through parameters, and these environment parameters may be packaged in a single parameter manner or in a parameter combination manner. In this way, the parameter information of the video communication conference place environment sent to the first terminal by the second terminal may be in a single parameter manner, or in a manner of environment parameters packet.

502. The first terminal selects a video communication conference place environment parameter used by the second terminal according to the parameter information of the video communication conference place environment supported by the second terminal.

Specifically, the first terminal selects, according to the locally supported video communication conference place environment information and the information about the video communication conference place environment supported by the second terminal, the video communication conference place environment parameter used by the second terminal, in which the video communication conference place environment parameter used by the second terminal is a parameter of a video communication conference place environment supported by both the first terminal and the second terminal.

Alternatively, the first terminal selects, according to a pre-stored local demand principle for a remote video communication conference place environment and the parameter information of the video communication conference place environment supported by the second terminal, a parameter corresponding to the video communication conference place environment used by the second terminal.

Alternatively, after the first terminal selects the video communication conference place parameter used by the second terminal, the following step may be further included:

503. The first terminal sends the selected video communication conference place environment parameter information to the second terminal.

The environment parameter selected by the first terminal is fed back to the second terminal through this step.

In embodiment 5 of the present invention, the first terminal selects a video communication conference place environment used by the second terminal according to the information about the video communication conference place environment supported by the second terminal, so that the video communication conference place environment used by the second terminal may be determined by the first terminal.

Embodiment 6

Figure 6:
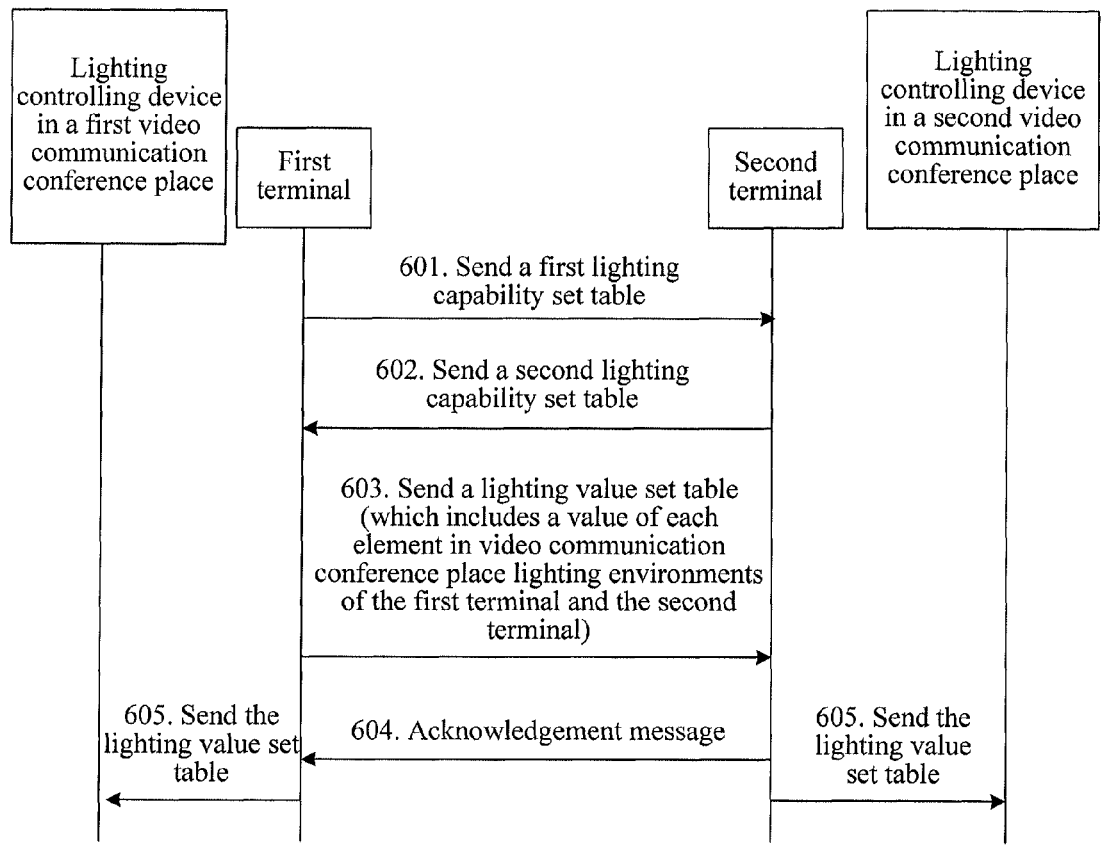
FIG. 6 is a diagram of a method for controlling a video communication conference place environment according to embodiment 6 of the present invention.

Referring to FIG. 6, embodiment 6 of the present invention provides a method for controlling a conference place environment in video communication, in the method, a first terminal determines, according to a first lighting capability set table of the first terminal and a second lighting capability set table of a second terminal, lighting parameter values applicable to video communication conference places of the first terminal and the second terminal, and the method specifically includes the following steps:

601. The first terminal sends the first lighting capability set table to the second terminal.

The first lighting capability set table includes: indication information denoting whether to turn on a peer control function, an expectation value of each element in a video communication conference place lighting environment of the first terminal, and a sequence of priorities of expectation values. In this embodiment of the present invention, the indication information denoting whether to turn on the peer control function indicates that the peer control function is turned off.

The first lighting capability set table may be shown in table 1.

TABLE 1

| Element Type (Unit) | Preferred Sequence 1 | Preferred Sequence 2 | Preferred Sequence 3 | Preferred Sequence 4 | Preferred Sequence 5 |
|---|---|---|---|---|---|
| Peer control function | | | Not turn on | | |
| Lighting illuminance (Lux) | 200 | 300 | 150 | 100 | 50 |
| Color temperature (K) | 4500 | 3200 | 6000 | 7000 | |
| Flicker frequency (Hz) | 50 | 60 | 100 | | |
| GAMMA compensation coefficient | 4.5 | 4.0 | 5.0 | | |
| Skin color compensation setting | On | Off | | | |

It should be noted that, Table content in embodiment 6 and subsequent embodiments of the present invention denotes a sequence of priorities of expectation values of an element in a conference place environment from left to right, for example, a sequence of priorities of the lighting illuminance of the video communication conference place of the first terminal is 200, 300, 150, 100 and 50.

602. After receiving the first lighting capability set table sent by the first terminal, the second terminal sends the second lighting capability set table to the first terminal.

The second lighting capability set table includes: indication information denoting whether to turn on a peer control function, a n expectation value of each element in a video communication conference place lighting environment of the second terminal, and a sequence of priorities of expectation values. In this embodiment of the present invention, the indication information denoting whether to turn on the peer control function indicates that the peer control function is turned off.

The second lighting capability set table may be shown in table 2.

the indication information denoting whether to turn on the peer control function, and if the indication information denoting whether to turn on the peer control function is not included, it is denoted by default that the peer control function is turned off.

603. The first terminal matches, according to a sequence of priorities of expectation values of elements in a video communication lighting environment supported by the first terminal and based on a sequence of the priorities of the expectation values of the elements from high to low, expectation values of corresponding elements in a video communication conference place lighting environment supported by the second terminal one by one, uses a first matched value as a value of a corresponding element in the video communication conference place lighting environments of the first terminal and the second terminal, and sends a lighting value set table formed of all element values to the second terminal, in which the table includes value information of each element of the video communication conference place lighting environments of the first terminal and the second terminal.

Specifically, for the lighting illuminance, if the sequence of priorities of the lighting illuminance of the video communication conference place of the first terminal is 200, 300, 150, 100 and 50, the first terminal searches for whether 200 exists in expectation values of the lighting illuminance of the video communication conference place of the second terminal (the expectation values of the lighting illuminance of the second terminal include 500, 300, 100, 50 and 400), and it may be seen from table 2 that 200 does not exist in the expectation values of the lighting illuminance of the video communication conference place of the second terminal; and then the first

TABLE 2

| Element Type (Unit) | Preferred Sequence 1 | Preferred Sequence 2 | Preferred Sequence 3 | Preferred Sequence 4 | Preferred Sequence 5 |
|---|---|---|---|---|---|
| Peer control function | | | Turn on/not turn on | | |
| Lighting illuminance (Lux) | 500 | 300 | 100 | 50 | 400 |
| Color temperature (K) | 4500 | 7000 | 6000 | 3200 | |
| Flicker frequency (Hz) | 100 | 50 | | | |
| GAMMA compensation coefficient | 4.5 | 4.0 | 5.0 | | |
| Skin color compensation setting | Off | | | | |

It should be noted that, the first lighting capability set table and/or the second lighting capability set table may not include terminal searches for whether 300 exists in the expectation values of the lighting illuminance of the video communication conference place of the second terminal, it may be seen from table 2 that 300 exists in the expectation values of the lighting illuminance of the video communication conference place of the second terminal, and therefore the value of the lighting illuminance of the video communication conference places of the first terminal and the second terminal is 300. The preceding manner is also adopted for other element values of the video communication conference place lighting environments of the first terminal and the second terminal, which is not repeated herein.

The lighting value set table is shown in table 3.

TABLE 3

| Element Type (Unit) | Selection Capability |
|---|---|
| Lighting illuminance (Lux) | 300 |
| Color temperature (K) | 4500 |
| Flicker frequency (Hz) | 100 |
| GAMMA compensation coefficient | 4.5 |
| Skin color compensation setting | Off |

604. The second terminal receives the lighting value set table, determines that a value of each element in the set table is an expectation value of the each element, and sends an acknowledgement message to the first terminal.

605. The first terminal sends the lighting value set table to a lighting controller in a video communication conference place corresponding to the first terminal (a first video communication conference place for short), and the lighting controller controls an illumination luminaire in the video communication conference place of the first terminal according to value information of each element in the lighting environment in the set table.

The second terminal sends the lighting value set table to a lighting controller in a video communication conference place of the second terminal (a second video communication conference place for short), and the lighting controller controls an illumination luminaire in the video communication conference place of the second terminal according to the value information of each element in the lighting environment in the set table.

In embodiment 6 of the present invention, the first terminal determines, according to the first lighting capability set table of the first terminal and the second lighting capability set table of the second terminal, the lighting applicable to the video communication conference places of the first terminal and the second terminal, so that the first terminal and the second terminal adopt the same lighting environment; the lighting environment parameter value is achieved through a negotiation manner, so that the two conference places are capable of having a conference under the same lighting environment, and conference participants are capable of achieving a more authentic experience effect of "having a conference together".

Embodiment 7

Figure 7:
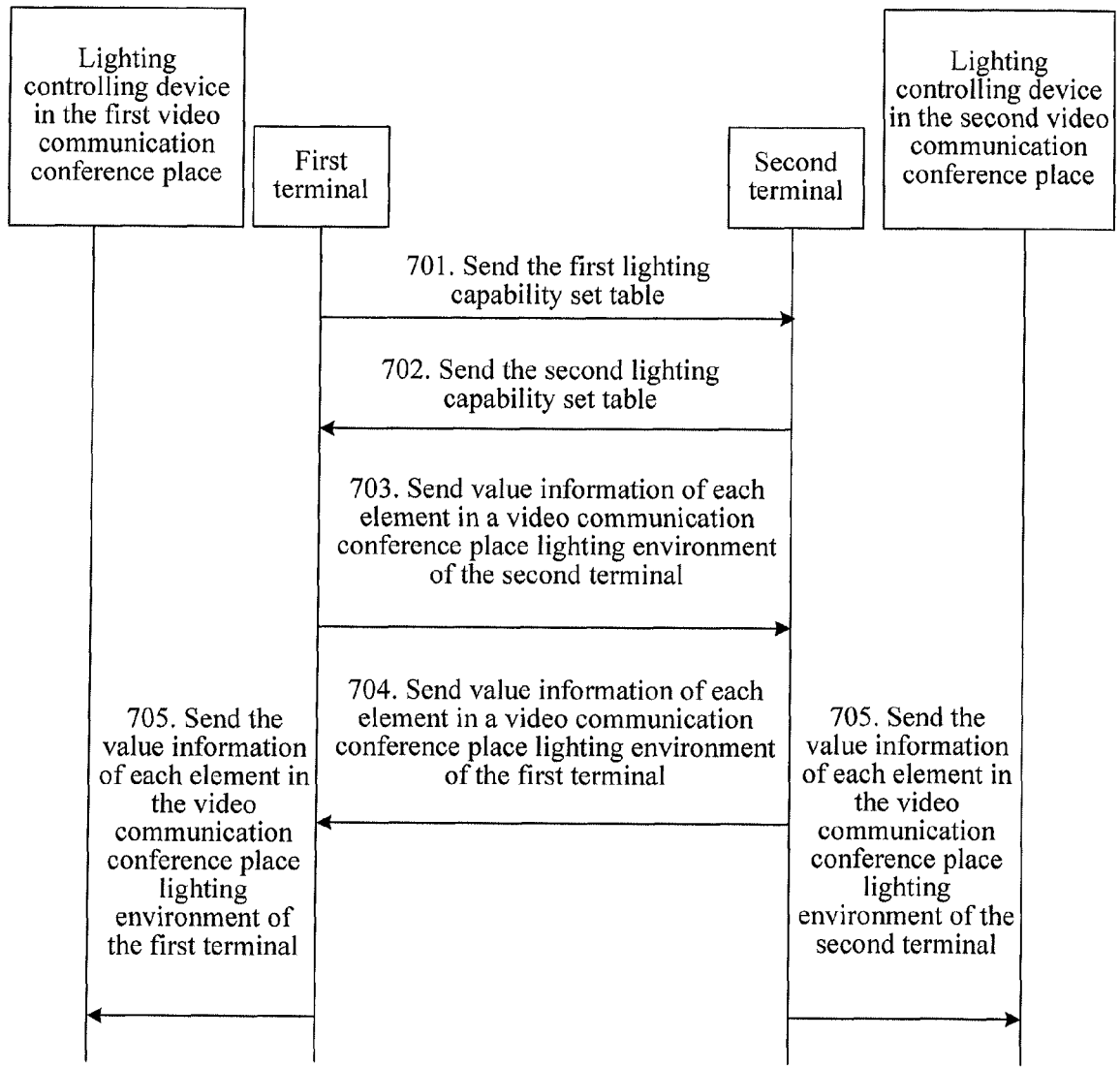
FIG. 7 is a diagram of a method for controlling a video communication conference place environment according to embodiment 7 of the present invention.

Referring to FIG. 7, embodiment 7 of the present invention provides a method for controlling a conference place environment in video communication, in the method, a terminal determines a value of each element in a video communication lighting environment of another terminal, and the method includes the following steps:

701. A first terminal sends a first lighting capability set table to a second terminal.

The first lighting capability set table includes: indication information denoting whether to turn on a peer control function (optional), an expectation value of each element in a video communication conference place lighting environment of the first terminal, and a sequence of priorities of expectation values. In this embodiment of the present invention, the indication information denoting whether to turn on the peer control function indicates that the peer control function is turned on. The first lighting capability set table may be shown in the preceding table 1.

702. After receiving the first lighting capability set table sent by the first terminal, the second terminal sends a second lighting capability set table to the first terminal.

The second lighting capability set table includes: indication information denoting whether to turn on a peer control function (optional), an expectation value of each element in a video communication conference place lighting environment of the second terminal, and a sequence of priorities of expectation values. In this embodiment of the present invention, the indication information denoting whether to turn on the peer control function indicates that the peer control function is turned on. The second lighting capability set table may be shown in the preceding table 2.

703. The first terminal knows, according to the second lighting capability set table, that the second terminal supports the peer control function. In this case, the first terminal determines, according to a pre-stored demand principle of the first terminal for a remote video communication conference place lighting environment and the expectation value of each element in the video communication conference place lighting environment of the second terminal, a value of each element in the video communication conference place lighting environment of the second terminal, and sends a value set table of the video communication conference place lighting environment of the second terminal to the second terminal, in which the table includes the value of each element in the video communication conference place lighting environment of the second terminal.

The demand principle of the first terminal for the remote video communication conference place lighting environment is shown in table 4.

TABLE 4

| Capability Type (Unit) | Expected Capability Sequence Rule |
|---|---|
| Lighting illuminance (Lux) | Expected maximum illuminance |
| Color temperature (K) | Expected color temperature closest to 4500 K |
| Flicker frequency (Hz) | Expected frequency closest to 50 Hz |
| GAMMA compensation coefficient | Expected coefficient closest to 4.5 |
| Skin color compensation setting | Expect that this function is turned on if possible, and if a peer party does not have this capability, this function is turned off |

For example, if a demand of the first terminal for lighting illuminance in the remote video communication lighting environment is the expected maximum lighting illuminance, the maximum value 500 is taken among expectation values of the lighting illuminance in the second lighting capability set table. If a demand of the first terminal for a color temperature in the remote video communication lighting environment is the expected color temperature closest to 4500 K, the color temperature closest to 4500 K is sought in expectation values of the color temperature in the second lighting capability set table, and 4500 K is found. A manner of taking values of other elements in the video communication lighting environment of the second terminal is similar to this manner, which is not repeated herein.

In this case, the determined value set table of the video communication conference place lighting environment of the second terminal is shown in table 5.

TABLE 5

| Capability Type (Unit) | Selection Capability |
| --- | --- |
| Lighting illuminance (Lux) | 500 |
| Color temperature (K) | 4500 |
| Flicker frequency (Hz) | 50 |
| GAMMA compensation coefficient | 4.5 |
| Skin color compensation setting | Off |

704. The second terminal knows, according to the first lighting capability set table, that the first terminal supports the peer control function. In this case, the second terminal determines, according to a pre-stored demand principle of the second terminal for a remote video communication lighting environment and the expectation value of each element in the video communication conference place lighting environment of the first terminal, a value of each element in the video communication lighting environment of the first terminal, and sends a value set table of the video communication conference place lighting environment of the first terminal to the first terminal, in which the table includes the value of each element in the video communication conference place lighting environment of the first terminal.

The demand principle of the second terminal for the remote video communication lighting environment is shown in table 6.

TABLE 6

| Capability Type (Unit) | Expected Capability Sequence Rule |
| --- | --- |
| Lighting illuminance (Lux) | Expected minimum illuminance |
| Color temperature (K) | Expected color temperature closest to 4500 K |
| Flicker frequency (Hz) | Expected frequency closest to 100 Hz |
| GAMMA compensation coefficient | Expected coefficient closest to 4.5 |
| Skin color compensation setting | Expect that this function is turned on if possible, and if a peer party does not have this capability, this function is turned off |

For example, if a demand of the second terminal for lighting illuminance in the remote video communication lighting environment is the expected minimum lighting illuminance, the minimum value 50 is taken among expectation values of the lighting illuminance in the first lighting capability set table. If a demand of the second terminal for a color temperature in the remote video communication lighting environment is the expected color temperature closest to 4500 K, the color temperature closest to 4500 K is sought in expectation values of the color temperature in the first lighting capability set table, and 4500 K is found. A manner of taking values of other elements in the video communication lighting environment of the first terminal is similar to this manner, which is not repeated herein.

In this case, the determined value set table of the video communication conference place lighting environment of the first terminal is shown in table 7.

TABLE 7

| Capability Type (Unit) | Selection Capability |
| --- | --- |
| Lighting illuminance (Lux) | 50 |
| Color temperature (K) | 4500 |
| Flicker frequency (Hz) | 100 |
| GAMMA compensation coefficient | 4.5 |
| Skin color compensation setting | On |

705. The first terminal sends the value set table of the video communication conference place lighting environment of the first terminal to a lighting controller in the video communication conference place of the first terminal (a first video communication conference place for short), and the lighting controller controls an illumination luminaire in the video communication conference place of the first terminal according to value information of each element in the lighting environment in the set table.

The second terminal sends the value set table of the video communication conference place lighting environment of the second terminal to a lighting controller in the video communication conference place of the second terminal (a second video communication conference place for short), and the lighting controller controls an illumination luminaire in the video communication conference place of the second terminal according to value information of each element in the lighting environment in the set table.

In embodiment 7 of the present invention, a terminal determines a value of each element in a video communication conference place lighting environment of another terminal, thereby achieving an objective that a terminal controls a video communication conference place lighting environment of another terminal.

Embodiment 8

Figure 8:
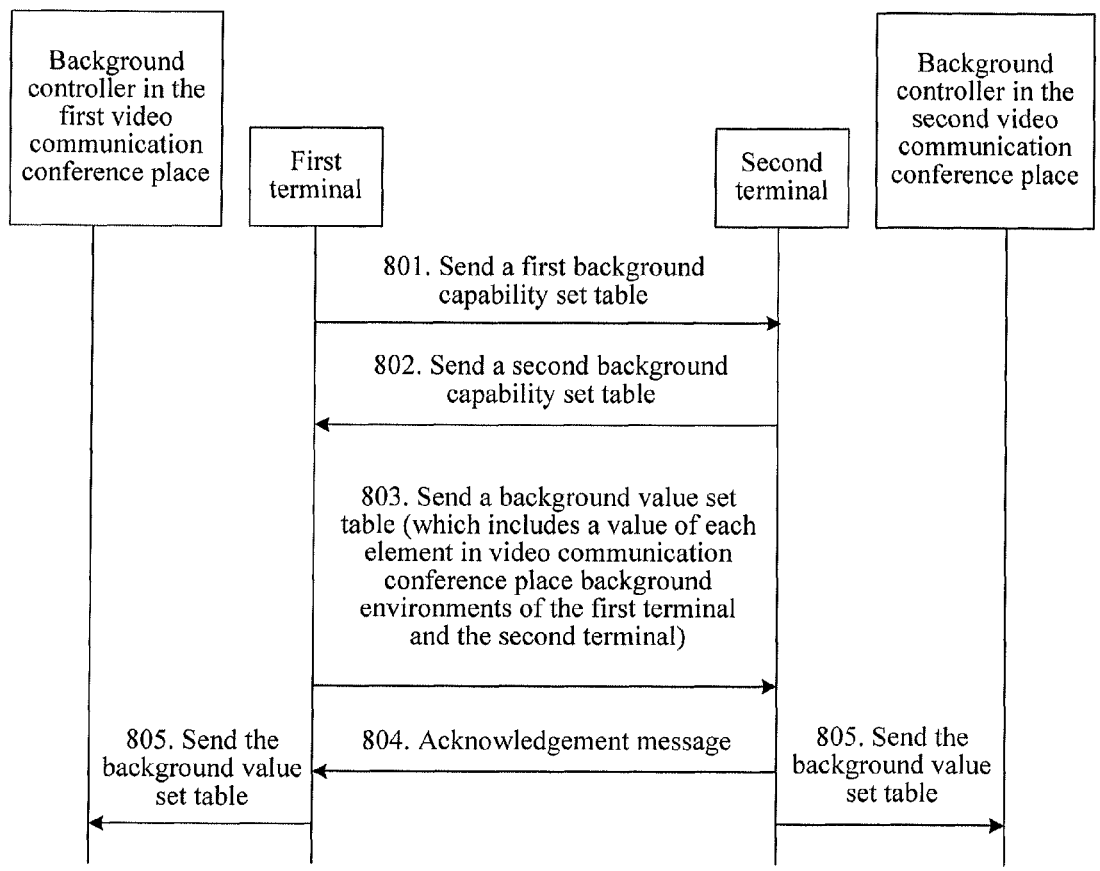
FIG. 8 is a diagram of a method for controlling a video communication conference place environment according to embodiment 8 of the present invention.

Referring to FIG. 8, embodiment 8 of the present invention provides a method for controlling a conference place environment in video communication, in the method, a first terminal determines, according to a first background capability set table of the first terminal and a second background capability set table of a second terminal, a background applicable to video communication conference places of the first terminal and the second terminal, and the method includes the following steps:

801. The first terminal sends the first background capability set table to the second terminal.

The first background capability set table includes: indication information denoting whether to turn on a peer control function, a n expectation value of each element in a video communication conference place background environment of the first terminal, and a sequence of priorities of expectation values. In this embodiment of the present invention, the indication information denoting whether to turn on the peer control function indicates that the peer control function is turned off.

The first background capability set table may be shown in table 8.

TABLE 8

| Element Type (Unit) | Preferred Sequence 1 | Preferred Sequence 2 | Preferred Sequence 3 | Preferred Sequence 4 | Preferred Sequence 5 |
|---|---|---|---|---|---|
| Wall background type | Beach (image) | Lake (image) | Meadow (image) | Skiing (video) | Grazing (video) |
| Wall background switch frequency (second) | Never | 100 | 50 | 20 | |
| Ceiling pattern | Pure white (image) | Blue sky and white cloud (image) | Sunset (image) | Sunrise (image) | |
| Floor pattern | Beach (image) | Meadow (image) | Wooden floor (image) | | |

802. After receiving the first background capability set table sent by the first terminal, the second terminal sends a second background capability set table to the first terminal.

The second background capability set table includes: indication information denoting whether to turn on a peer control function, a n expectation value of each element in a video communication conference place background environment of the second terminal, and a sequence of priorities of expectation values. In this embodiment of the present invention, the indication information denoting whether to turn on the peer control function indicates that the peer control function is turned off.

The second background capability set table may be shown in table 9.

TABLE 9

| Capability Type (Unit) | Preferred Sequence 1 | Preferred Sequence 2 | Preferred Sequence 3 | Preferred Sequence 4 | Preferred Sequence 5 |
|---|---|---|---|---|---|
| Wall background type | Lake (image) | Yacht (image) | Car (image) | Waterfall (video) | Grazing (video) |
| Wall background switch frequency (second) | 300 | 200 | 100 | 50 | 20 |
| Ceiling pattern | Blue sky and white cloud (image) | Sunset (image) | Sunrise (image) | | |
| Floor pattern | Wooden floor (image) | Meadow (image) | | | |

803. The first terminal matches, according to the sequence of priorities of the expectation values of elements in the video communication conference place background environment of the first terminal and based on a sequence of the priorities of the expectation values of the elements from high to low, expectation values of corresponding elements in the video communication conference place background environment of the second terminal one by one, uses a first matched value as a value of a corresponding element in the video communication conference place background environments of the first terminal and the second terminal, and sends a background value set table to the second terminal, in which the background value set table includes a value of each element of the video communication conference place background environments of the first terminal and the second terminal.

Specifically, the sequence of priorities of wall patterns in the video communication conference place of the first terminal is the beach (image), the lake (image), the meadow (image), the skiing (video), and the grazing (image). First, whether the beach (image) exists is searched in the wall patterns in the video communication conference place of the second terminal, and it may be seen from table 9 that the beach (image) does not exist in the wall patterns in the video communication conference place of the second terminal. Then, whether the lake (image) exists is searched in the wall patterns in the video communication conference place of the second terminal, and it may be seen from table 9 that the lake (image) exists in the wall patterns in the video communication conference place of the second terminal. In this case, it is determined that the wall pattern of the video communication background of the first terminal and the second terminal is the lake (image). A manner of determining elements in other background environments is similar to the manner in the preceding description, which is not repeated herein.

The determined background value table is shown in table 10.

TABLE 10

| Capability Type (Unit) | Selection Capability |
|---|---|
| Wall background type | Lake (image) |
| Wall background switch frequency (second) | 100 |
| Ceiling pattern | Blue sky and white cloud (image) |
| Floor pattern | Meadow (image) |

804. After receiving the background value set table, the second terminal determines that a value of each element in the set table is an expectation value of a corresponding element in a background of the second terminal, and sends an acknowledgement message to the first terminal.

805. The first terminal sends the background value set table to a background controller in the video communication conference place of the first terminal (a first video communication conference place for short), and the background controller controls a background in the video communication conference place of the first terminal according to value information of each element in the background environment in the background value set table.

The second terminal sends the background value set table to a background controller in the video communication conference place of the second terminal (a second video communication conference place for short), and the background controller controls a background in the video communication conference place of the second terminal according to the value information of each element in the background environment in the background value set table.

In embodiment 8 of the present invention, the first terminal determines, according to the first background capability set table of the first terminal and the second background capability set table of the second terminal, the background applicable to the video communication of the first terminal and the second terminal, so that the first terminal and the second terminal adopt the same video communication background.

Embodiment 9

Figure 9:
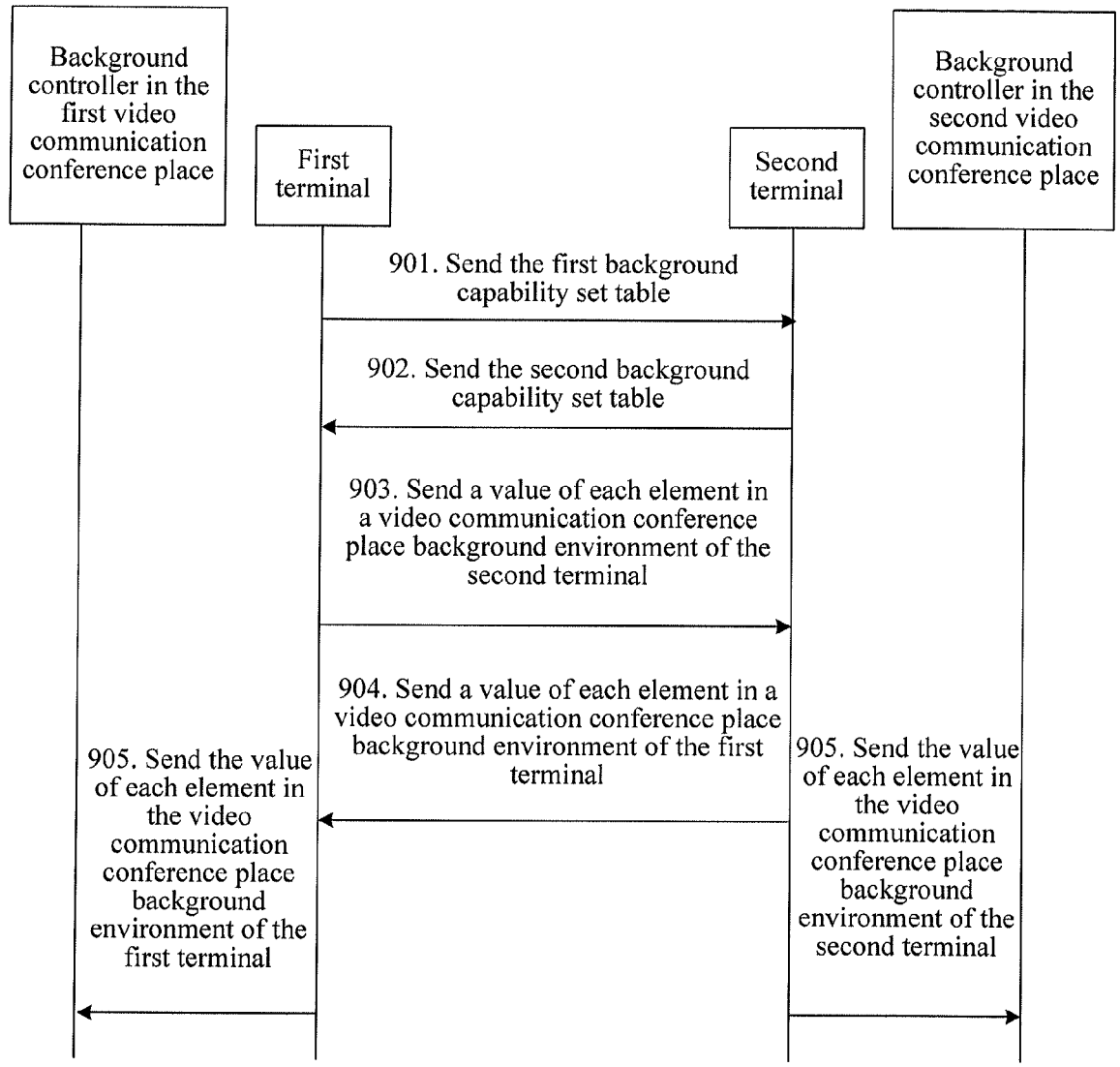
FIG. 9 is a diagram of a method for controlling a video communication conference place environment according to embodiment 9 of the present invention.

Referring to FIG. 9, embodiment 9 of the present invention provides a method for controlling a conference place environment in video communication, in the method, a terminal determines a value of each element in a video communication background of another terminal, and the method includes the following steps:

Step 901 to step 902 are the same as step 801 to step 802, which are not repeated herein.

903. The first terminal knows, according to the second background capability set table, that the second terminal supports the peer control function. In this case, the first terminal determines, according to a pre-stored demand principle of the first terminal for a remote video communication conference place background environment and the expectation value of each element in the video communication conference place background environment supported by the second terminal, a value of each element in the video communication conference place background environment of the second terminal, and sends a background value set table of the video communication conference place of the second terminal to the second terminal, in which the background value set table of the video communication conference place of the second terminal includes the value of each element in the video communication conference place background environment of the second terminal.

The demand principle of the first terminal for the remote video communication conference place background environment is shown in table 11.

TABLE 11

| Element Type (Unit) | Expected Rule |
| --- | --- |
| Wall background type | Expect to randomly play a "video" |
| Wall background switch frequency (second) | Fastest switch |
| Wall background brightness (Lux) | Highest brightness |
| Ceiling pattern | Randomly switch an image |
| Floor pattern | Randomly switch an image |

Specifically, if an expectation value of the first terminal for the wall background in the remote video communication conference place is randomly playing a "video", whether a video exists is searched in expectation values of the wall background in the second background capability set table of the second terminal, and it may be seen from table 9 that the wall background of the local communication conference place of the second terminal may be the waterfall (video), and therefore, it is determined that the wall background in the video communication conference place of the second terminal is the waterfall (video). A manner for determining other element values of the background in the video communication conference place of the second terminal is similar to this manner, which is not repeated herein.

The background value set table of the video communication conference place of the second terminal is shown in table 12.

TABLE 12

| Capability Type (Unit) | Selection Capability |
| --- | --- |
| Wall background type | Waterfall (video) |
| Wall background switch frequency (second) | 20 |
| Wall background brightness (Lux) | 200 |
| Ceiling pattern | Blue sky and white cloud (image) |
| Floor pattern | Wooden floor (image) |

904. The second terminal knows, according to the first background capability set table, that the first terminal supports the peer control function. In this case, the second terminal determines, according to a pre-stored demand principle of the second terminal for a remote video communication background and the expectation value of each element in the video communication conference place background environment of the first terminal, a value of each element in the video communication conference place background environment of the first terminal, and sends a background value set table of the video communication conference place of the first terminal to the first terminal, in which the table includes the value of each element of the video communication conference place background environment of the first terminal.

The demand principle of the second terminal for the remote video communication conference place background environment is shown in table 13.

TABLE 13

| Capability Type (Unit) | Expected Rule |
| --- | --- |
| Wall background type | Expect to randomly play a "image" |
| Wall background switch frequency (second) | Never |
| Wall background brightness (Lux) | Lowest brightness |
| Ceiling pattern | Images in a peer preferred sequence |
| Floor pattern | Images in a peer preferred sequence |

Specifically, if an expectation value of the second terminal for the wall background in the remote video communication conference place is randomly playing a "image", whether an image exists is searched in expectation values of the wall background in the first background capability set table of the first terminal, and it may be seen from table 8 that the video conference background environment of the first terminal supports an image and the priority sequence is the beach (image), the lake (image) and the meadow (image). Therefore, the beach (image) with a high priority is taken as the wall background in the video communication conference place of the first terminal. A manner for determining other element values of the video communication conference place background environment of the first terminal is similar to this manner, which is not repeated herein.

The background value set table of the video communication conference place of the first terminal is shown in table 14.

TABLE 14

| Capability Type (Unit) | Preferred Sequence 1 |
| --- | --- |
| Wall background type | Beach (image) |
| Wall background switch frequency (second) | Never |

TABLE 14-continued

| Capability Type (Unit) | Preferred Sequence 1 |
|---|---|
| Wall background brightness (Lux) | 60 |
| Ceiling pattern | Pure white (image) |
| Floor pattern | Beach (image) |

905. The first terminal sends the value set table of the video communication conference place background environment of the first terminal to a background controller in the video communication conference place of the first terminal (a first video communication conference place for short), and the background controller controls a background in the video communication conference place of the first terminal according to value information of each element in the background environment in the set table.

The second terminal sends the value set table of the video communication conference place background environment of the second terminal to a background controller in the video communication conference place of the second terminal (a second video communication conference place for short), and the background controller controls a background in the video communication conference place of the second terminal according to value information of each element in the background environment in the set table.

In embodiment 9 of the present invention, a terminal determines a value of each element in a video communication conference place background environment of another terminal, thereby achieving an objective that a terminal controls a video communication conference place background of another terminal.

Embodiment 10

Figure 10:
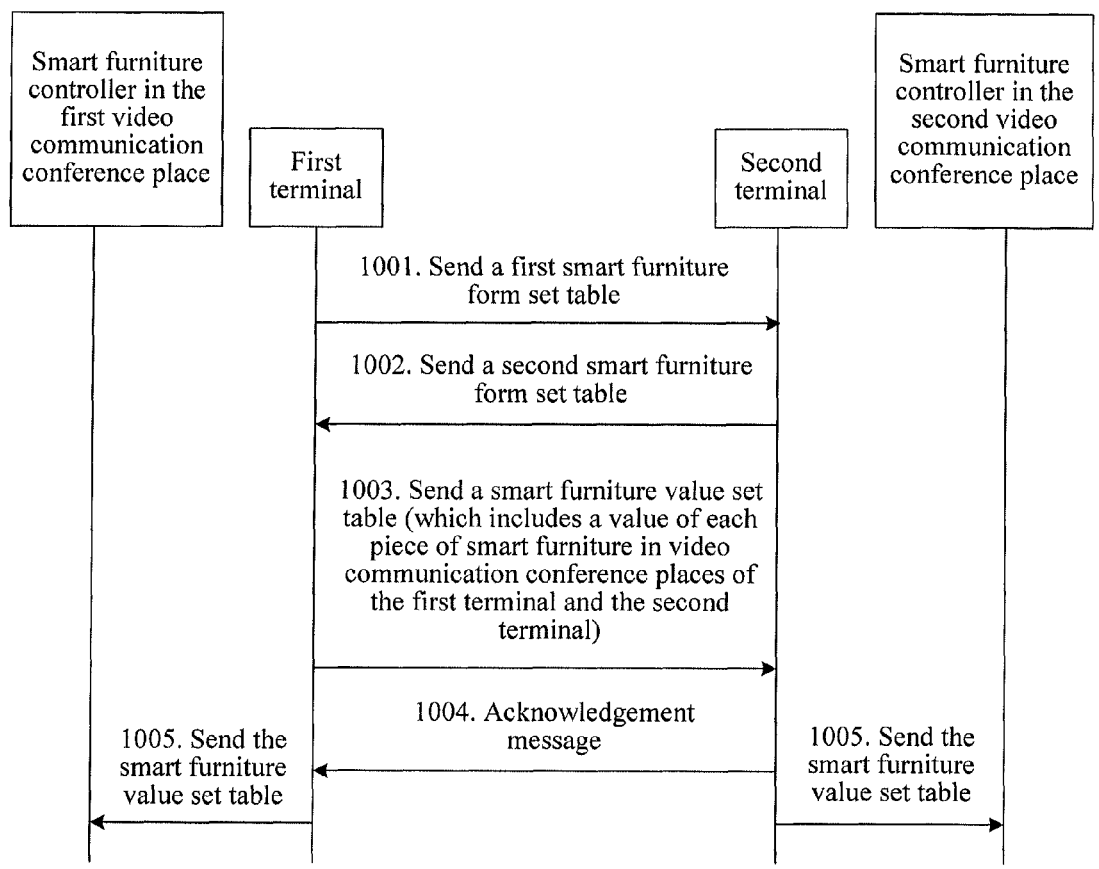
FIG. 10 is a diagram of a method for controlling a video communication conference place environment according to embodiment 10 of the present invention.

Referring to FIG. 10, embodiment 10 of the present invention provides a method for controlling a conference place environment in video communication, in the method, a first terminal determines, according to a first smart furniture form set table of the first terminal and a second smart furniture form set table of a second terminal, forms of smart furniture in video communication conference places of the first terminal and the second terminal, and the method includes the following steps:

1001. The first terminal sends the first smart furniture form set table to the second terminal.

The first smart furniture form set table includes: indication information denoting whether to turn on a peer control function, a n expectation value of each element in a video communication conference place furnishing environment of the first terminal, and a sequence of priorities of expectation values. In this embodiment and subsequent embodiments, each element in the video communication conference place furnishing environment is each piece of smart furniture in the video communication conference place furnishing environment; in this case, the expectation value of the each element is a form expectation value of the smart furniture. In this embodiment of the present invention, the indication information denoting whether to turn on the peer control function indicates that the peer control function is turned off.

The first smart furniture form set table may be shown in table 15.

TABLE 15

| Element Type (Unit) | | Preferred Sequence 1 | Preferred Sequence 2 | Preferred Sequence 3 | Preferred Sequence 4 | Preferred Sequence 5 |
|---|---|---|---|---|---|---|
| Smart chair | Horizontal angle | 0 (in middle) | −15 (turn left) | +15 (turn right) | −30 (turn left) | +30 (turn right) |
| | Vertical angle | 0 (lay flat) | +10 (nose-up) | +15 (nose-up) | +20 (nose-up) | +30 (nose-up) |
| Smart table (slant angle) | | 0 (lay flat) | +5 (slant outward) | −5 (slant inward) | +10 (slant outward) | −10 (slant inward) |
| Popup of smart foot pad | | Not pop up | Pop up | | | |

1002. The second terminal sends the second smart furniture form set table to the first terminal.

The second smart furniture form set table includes: indication information denoting whether to turn on a peer control function, a form expectation value of each piece of smart furniture in a video communication conference place furnishing environment supported by the second terminal, and a sequence of priorities of form expectation values. In this embodiment of the present invention, the indication information denoting whether to turn on the peer control function indicates that the peer control function is turned off.

The second smart furniture form set table may be shown in table 16.

TABLE 16

| Elements Type | | Preferred Sequence 1 | Preferred Sequence 2 | Preferred Sequence 3 | Preferred Sequence 4 | Preferred Sequence 5 |
|---|---|---|---|---|---|---|
| Smart chair | Horizontal angle | 0 (in middle) | −15 (turn left) | +15 (turn right) | −30 (turn left) | +30 (turn right) |
| | Vertical angle | 0 (lay flat) | +10 (nose-up) | +15 (nose-up) | | |
| Smart table (slant angle) | | 0 (lay flat) | +10 (slant outward) | −10 (slant inward) | | |
| Popup of smart foot pad | | Without this function | | | | |

1003. The first terminal matches, according to the sequence of priorities of the expectation values of elements in the video communication conference place furnishing environment of the first terminal and based on a sequence of the priorities of the expectation values of the elements from high to low, expectation values of corresponding elements in the video communication conference place furnishing environment of the second terminal one by one, uses a first matched value as a value of a corresponding element in the video communication conference place furnishing environments of the first terminal and the second terminal, and sends a smart furniture value set table to the second terminal, in which the smart furniture value set table includes the value of each element in the video communication conference place furnishing environments of the first terminal and the second terminal.

The specific implementation manner of this step is similar to that of step 603 in embodiment 6, which is not repeated herein. The smart furniture value set table is shown in table 17.

TABLE 17

| Capability Type (Unit) | Preferred Sequence 1 |
|---|---|
| Smart chair (horizontal angle) | 0 (in middle) |
| Smart chair (vertical angle) | 0 (lay flat) |
| Smart table (slant angle) | 0 (lay flat) |
| Popup of smart foot pad | Not adopt this function |

1004. The second terminal receives the smart furniture value set table sent by the first terminal, determines that a value of each element in the smart furniture value set table is an expectation value of the each element, and sends an acknowledgement message to the first terminal.

1005. The first terminal sends the smart furniture value set table of the video communication conference place of the first terminal to a smart furniture controller in the video communication conference place of the first terminal (a first video communication conference place for short), and the smart furniture controller controls a smart furniture form in the video communication conference place of the first terminal according to value information of each piece of smart furniture in the set table.

The second terminal sends the smart furniture environment value set table of the video communication conference place of the second terminal to a smart furniture controller in the video communication conference place of the second terminal (a second video communication conference place for short), and the smart furniture controller controls a smart furniture form in the video communication conference place of the second terminal according to value information of each piece of smart furniture in the set table.

In embodiment 10 of the present invention, a first terminal determines, according to a first smart furniture form set table of the first terminal and a second smart furniture form set table of a second terminal, a form of each piece of smart furniture in a video communication conference place applicable to the first terminal and the second terminal, so that each piece of smart furniture in the video communication conference places of the first terminal and of the second terminal adopt the same form.

Embodiment 11

Figure 11:
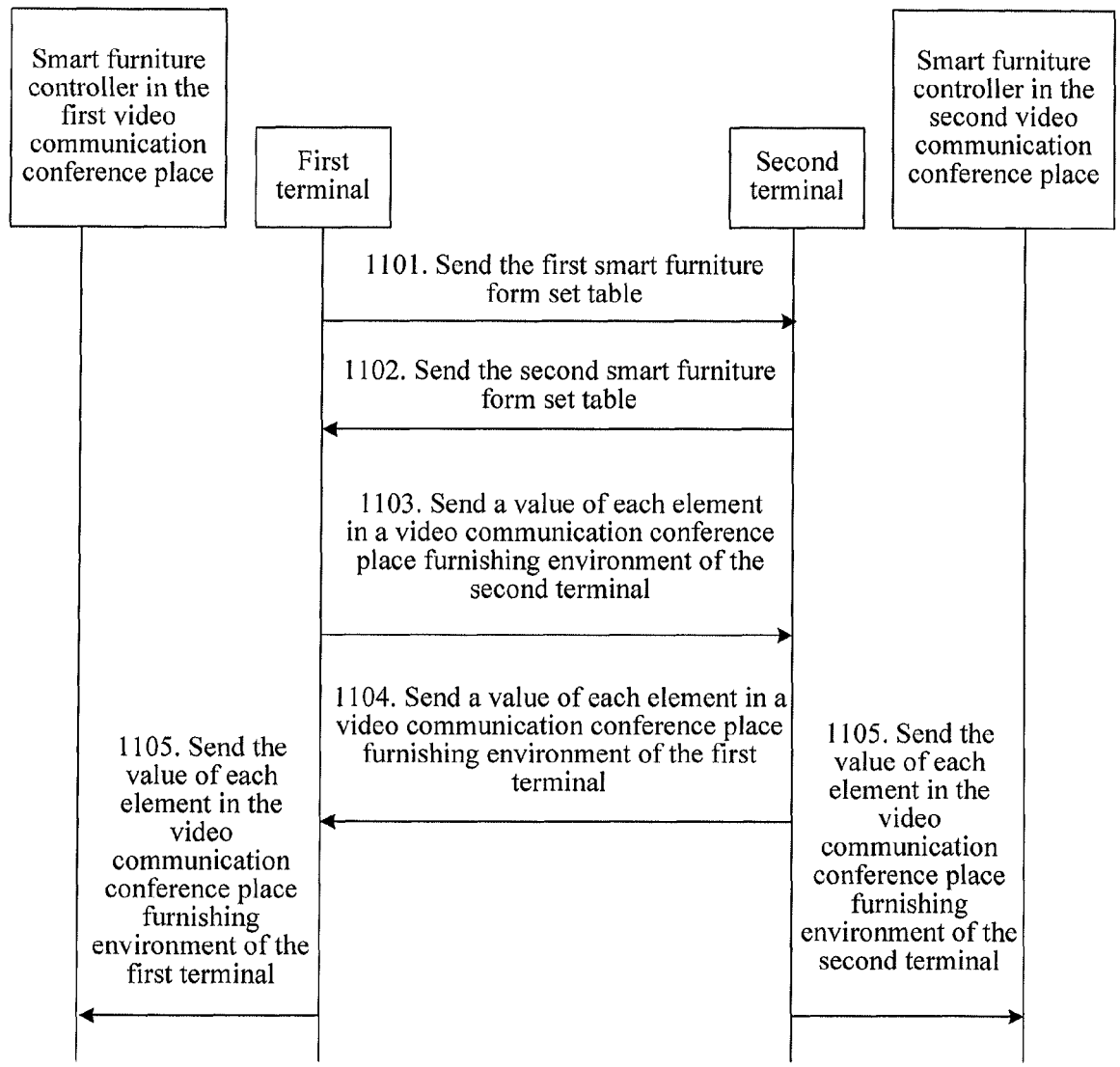
FIG. 11 is a diagram of a method for controlling a video communication conference place environment according to embodiment 11 of the present invention.

Referring to FIG. 11, embodiment 11 of the present invention provides a method for controlling a conference place environment in video communication, in the method, a terminal determines a form of each piece of smart furniture in a video communication conference place of another terminal, and the method includes the following steps:

Step 1101 to step 1102 are the same as step 1001 to step 1002, which are not repeated herein.

1103. The first terminal knows, according to the second smart furniture form set table, that the second terminal supports the peer control function. In this case, the first terminal determines, according to a pre-stored demand principle of the first terminal for a smart furniture form in a remote video communication conference place and the form expectation value of each piece of smart furniture in the video communication conference place supported by the second terminal, a form value of each piece of smart furniture in a video communication conference place used by the second terminal, and sends a smart furniture value set table of the video communication conference place of the second terminal to the second terminal, in which the table includes the form value of each piece of smart furniture in the video communication conference place of the second terminal.

The demand principle of the first terminal for the smart furniture form in the remote video communication conference place is shown in table 18.

TABLE 18

| Capability Type (Unit) | Expected Capability Sequence Rule |
|---|---|
| Smart chair (horizontal angle) | 0 (in middle) |
| Smart chair (vertical angle) | 0 (lay flat) |
| Smart table (slant angle) | 0 (lay flat) |
| Popup of smart foot pad | Pop up if possible |

The smart furniture value set table of the video communication conference place of the second terminal is shown in table 19.

TABLE 19

| Capability Type (Unit) | Preferred Sequence 1 |
|---|---|
| Smart chair (horizontal angle) | 0 (in middle) |
| Smart chair (vertical angle) | 0 (lay flat) |
| Smart table (slant angle) | 0 (lay flat) |
| Popup of smart foot pad | Not adopt this function |

1104. The second terminal knows, according to the first smart furniture form set table, that the first terminal supports the peer control function. In this case, the second terminal determines, according to a pre-stored demand principle of the second terminal for a smart furniture form in a remote video communication conference place and the form expectation value of each piece of smart furniture in the video communication conference place supported by the first terminal, a form value of each piece of smart furniture in the video communication conference place used by the first terminal, and sends a value set table of each piece of smart furniture in the video communication conference place of the first terminal to the first terminal, in which the table includes the form value of each piece of smart furniture in the video communication conference place of the first terminal.

The demand principle of the second terminal for the smart furniture form in the remote video communication conference place is shown in table 20.

TABLE 20

| Capability Type (Unit) | Expected Capability Sequence Rule |
|---|---|
| Smart chair (horizontal angle) | To be left as much as possible |
| Smart chair (vertical angle) | 0 (lay flat) |
| Smart table (slant angle) | Slant outward as much as possible |
| Popup of smart foot pad | Not pop up |

The smart furniture value set table of the video communication conference place of the first terminal is shown in table 21.

TABLE 21

| Capability Type (Unit) | Preferred Sequence 1 |
|---|---|
| Smart chair (horizontal angle) | −30 (turn left) |
| Smart chair (vertical angle) | 0 (lay flat) |
| Smart table (slant angle) | +10 (slant outward) |
| Popup of smart foot pad | Not pop up |

1105. The first terminal sends the smart furniture value set table of the video communication conference place of the first terminal to a smart furniture controller in the video communication conference place of the first terminal (a first video communication conference place for short), and the smart furniture controller controls a smart furniture form in the video communication conference place of the first terminal according to value information of each piece of smart furniture in the set table.

The second terminal sends the smart furniture value set table of the video communication conference place of the second terminal to a smart furniture controller in the video communication conference place of the second terminal (a second video communication conference place for short), and the smart furniture controller controls a smart furniture form in the video communication conference place of the second terminal according to value information of each piece of smart furniture in the set table.

In embodiment 11 of the present invention, a terminal determines a form value of each piece of smart furniture in a video communication conference place of another terminal, thereby achieving an objective that a terminal controls a form of each piece of smart furniture of the video communication conference place of another terminal.

Embodiment 12

Figure 12A:
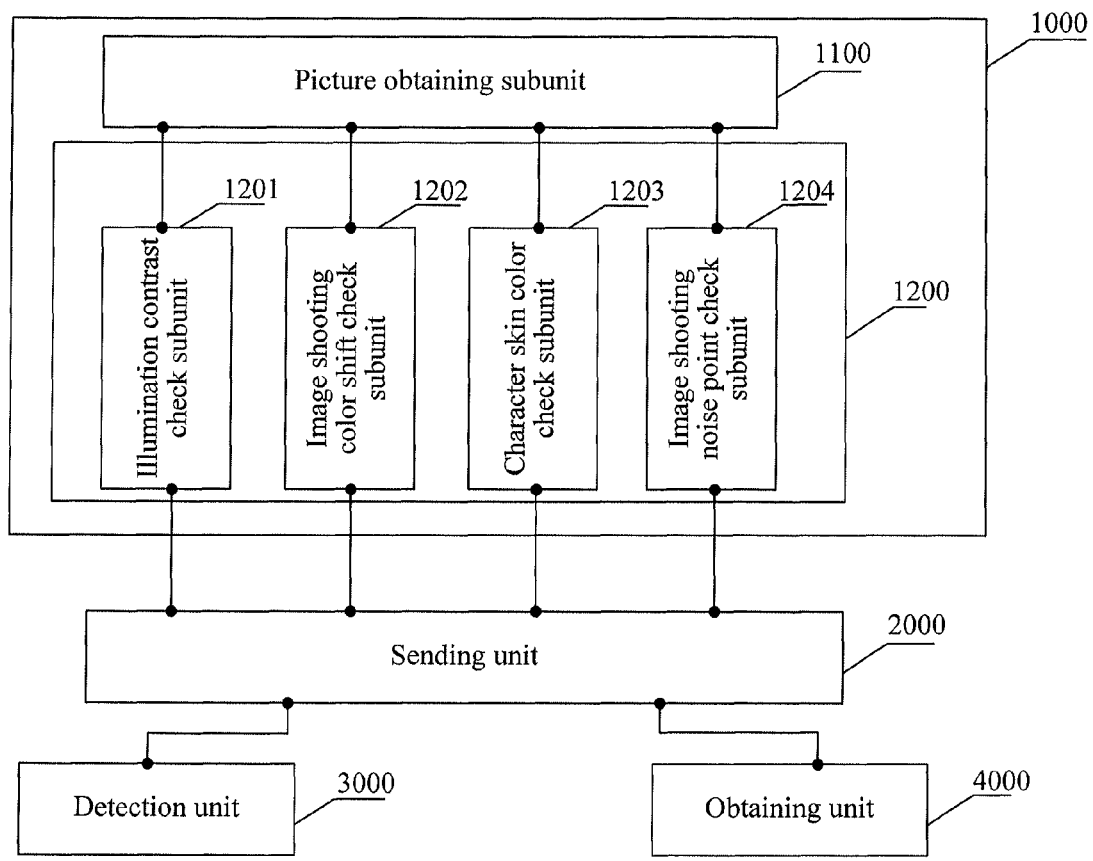
FIG. 12A is a structural diagram of an apparatus for controlling a conference place environment in video communication according to embodiment 12 of the present invention.
Figure 12B:
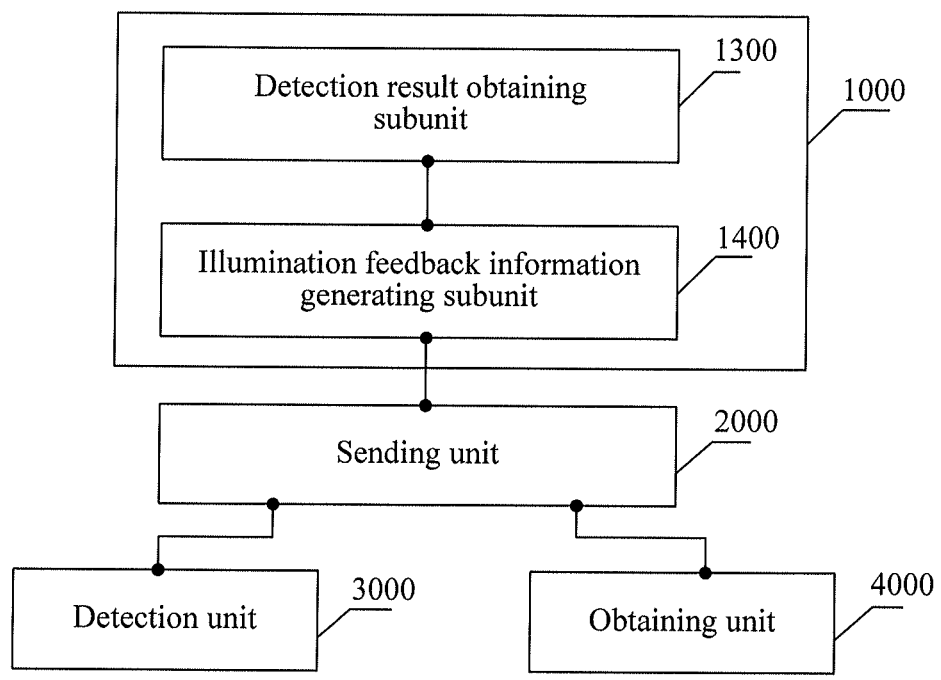
FIG. 12B is a structural diagram of another apparatus for controlling a conference place environment in video communication according to embodiment 12 of the present invention.

Referring to FIG. 12A and FIG. 12B, embodiment 12 of the present invention provides an apparatus for controlling a video communication conference place environment, which includes:

a generating unit 1000, configured to generate illumination feedback information indicating an illumination effect of a video communication conference place, in which the illumination feedback information includes: a parameter indicating an illumination flaw or a parameter indicating correction of the illumination flaw; and a sending unit 2000, configured to output the illumination feedback information, in which the illumination feedback information is a basis on which a lighting controlling device in the video communication conference place controls lighting of the video communication conference place.

Specifically, as shown in FIG. 12A, the generating unit 1000 includes: an image obtaining subunit 1100, configured to obtain an image of the video communication conference place shot by an image shooting apparatus; and an illumination feedback information generating subunit 1200, configured to generate the illumination feedback information according to the image.

Preferably, the image obtaining subunit 1100 is an image receiving subunit, configured to receive an image of a remote video communication conference place shot by the image shooting apparatus and sent by a remote terminal; and in this case, the sending unit 2000 is specifically configured to output the illumination feedback information to the remote terminal.

Specifically, the illumination feedback information generating subunit 1200 includes at least one of the following: an illumination contrast check subunit 1201, an image shooting noise point check subunit 1202, an image shooting color shift check subunit 1203 and a character skin color check subunit 1204, in which, the illumination contrast check subunit 1201 is configured to obtain a parameter denoting brightness of the image, when determining that the parameter denoting brightness of the image is greater than a first threshold, generate a parameter indicating excessively strong illumination or a parameter indicating reduction of lighting illuminance; and when determining that the parameter denoting brightness of the image is smaller than a second threshold, generate a parameter indicating excessively weak illumination or a parameter indicating increase of the lighting illuminance;

the image shooting color shift check subunit 1202 is configured to determine, according to the image, whether a color shift occurs in a background color of the image, and if yes, determine an illumination flaw causing the color shift occurring in the background color, and generate a parameter indicating the illumination flaw or a parameter indicating correction of the illumination flaw;

the character skin color check subunit 1203 is configured to extract a character image from the image, and determine whether a color shift occurs in a character skin color in the character image, and if yes, determine an illumination flaw causing the color shift occurring in the character skin color, and generate a parameter indicating the illumination flaw or a parameter indicating correction of the illumination flaw; and the image shooting noise point check subunit 1204 is configured to determine whether a noise exists in the image, and if yes, determine an illumination flaw causing the noise, and generate a parameter indicating the illumination flaw or a parameter indicating correction of the illumination flaw.

Alternatively, as shown in FIG. 12B, the generating unit 1000 includes: a detection result obtaining subunit 1300, configured to obtain a result of detection performed by an illumination sensor on the lighting in the video communication conference place; and an illumination feedback information generating subunit 1400, configured to generate the illumination feedback information according to the detection result.

Preferably, the apparatus further includes: a detection unit 3000, configured to detect whether a local microphone receives a voice of a local spokesman, or detect whether a remote microphone receives a voice of a remote spokesman; and in this case, the sending unit 2000 is further configured to, after the detection unit 3000 detects that the local microphone receives a voice of the local spokesman, send first instruction information to a local lighting controlling device, in which the first instruction information is used to instruct the local lighting controlling device to highlight the local spokesman by using illumination; and, after the detection unit 3000 detects that the remote microphone receives a voice of the remote spokesman, send second instruction information to a remote terminal, in which the second instruction information is used to instruct a remote lighting controlling device to highlight the remote spokesman by using illumination;

Alternatively, the apparatus further includes: an obtaining unit 4000, configured to obtain indication information that is sent by the remote terminal and denotes that the remote microphone receives a voice of the remote spokesman; and in this case, the sending unit 2000 is further configured to, after the obtaining unit 4000 obtains the indication information, send second instruction information to the remote terminal, in which the second instruction information is used to instruct the remote lighting controlling device to highlight the remote spokesman by using illumination.

In embodiment 12 of the present invention, the apparatus for controlling a video communication conference place environment generates, according to the image, illumination feedback information indicating the illumination effect of the video communication conference place, so that enables the lighting controlling device in the video communication conference place controls the lighting in the video communication conference place according to the illumination feedback information, thereby solving the illumination flaw in time; specifically, the illumination feedback information may be generated according to the image of the video communication conference place shot by the image shooting apparatus, which is applicable to that the local terminal controls the lighting of the remote video communication conference place; and the illumination feedback information may also be generated according to the result of the detection performed by the illumination sensor on the lighting in the video communication conference place, which is applicable to that the local terminal controls the lighting of the local video communication conference place.

Embodiment 13

Figure 13A:
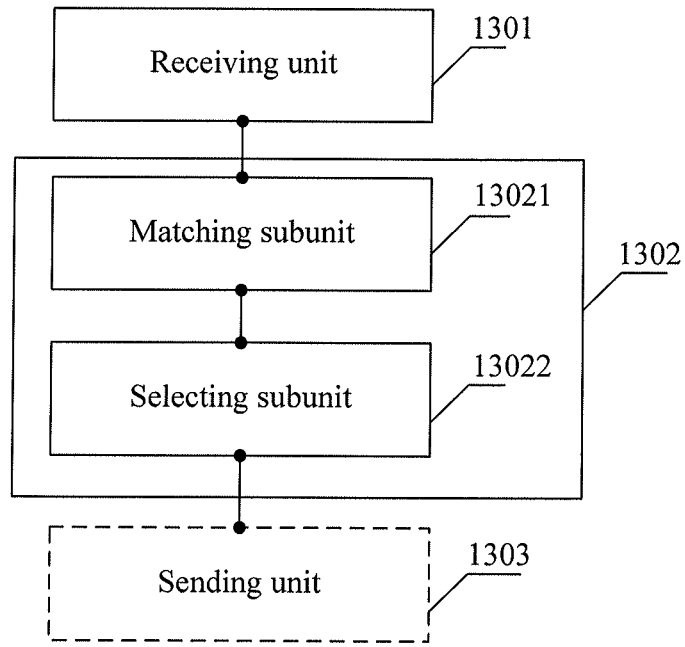
FIG. 13A is a structural diagram of an apparatus for controlling a conference place environment in video communication according to embodiment 13 of the present invention.
Figure 13B:
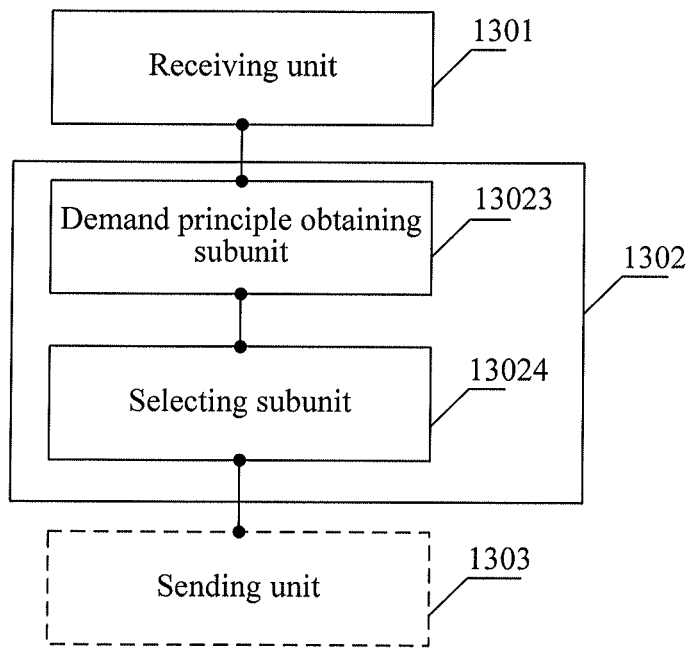
FIG. 13B is a structural diagram of another apparatus for controlling a conference place environment in video communication according to embodiment 13 of the present invention.

Referring to FIG. 13A and FIG. 13B, embodiment 13 of the present invention provides an apparatus for controlling a video communication conference place environment, in which the apparatus for controlling a video communication conference place environment is located on a first terminal, and includes:

a receiving unit 1301, configured to receive information about a video communication conference place environment supported by a second terminal, in which, the video communication conference place environment includes lighting, a background, a conference table and chair, an environment temperature, and so on, in a video communication conference place; and a selecting unit 1302, configured to select a video communication conference place environment used by the second terminal according to the information about the video communication conference place environment supported by the second terminal.

In order to feed back the video communication conference place environment selected by the first terminal to the second terminal, the apparatus for controlling a video communication conference place environment may further include:

a sending unit 1303, configured to send information about the selected video communication conference place environment to the second terminal.

Specifically, as shown in FIG. 13A, the selecting unit 1302 includes: a matching subunit 13021, configured to match, according to a sequence of priorities of expectation values of elements in a video communication conference place environment supported by the first terminal and based on a sequence of the priorities of the expectation values of the elements from high to low, expectation values of corresponding elements in the video communication conference place environment supported by the second terminal one by one; and a selecting subunit 13022, configured to use a first value matched by the matching subunit 13021 as a value of a corresponding element in the video communication conference place environments of the first terminal and the second terminal.

Alternatively, as shown in FIG. 13B, the selecting unit 1302 includes: a demand principle obtaining subunit 13023, configured to obtain a local demand principle for a remote video communication conference place environment; and a selecting subunit 13024, configured to select, according to the local demand principle for the remote video communication conference place environment and the information about the video communication conference place environment supported by the second terminal, the video communication conference place environment used by the second terminal.

In embodiment 13 of the present invention, the first terminal selects, according to the information about the video communication conference place environment supported by the second terminal, a video communication conference place environment used by the second terminal, so that the video communication conference place environment used by the second terminal may be determined by the first terminal.

Persons of ordinary skill in the art may understand that all or part of the steps of the methods according to the embodiments of the present invention may be implemented by a program instructing relevant hardware. The program may be stored in a computer readable storage medium, such as a read-only memory, a magnetic disk or an optical disk.

The method, the apparatus and the system for controlling a conference place environment in video communication according to the embodiments of the present invention are introduced in detail in the foregoing. Specific cases are used for illustrating principles and implementation manners of the present invention. The preceding descriptions of the embodiments are merely for understanding the method and core ideas of the present invention. Meanwhile, persons of ordinary skill in the art may make modifications to the specific implementation manners and application ranges according to the idea of the present invention. In conclusion, the content of the specification shall not be regarded as a limitation to the present invention.

What is claimed is:

1. A method for controlling a video communication conference place environment, comprising:
    generating illumination feedback information indicating an illumination effect of a video communication conference place, wherein the illumination feedback information comprises: a parameter indicating an illumination flaw or a parameter indicating correction of the illumination flaw;
    outputting the illumination feedback information, so that a lighting controlling device in the video communication conference place controls lighting in the video communication conference place according to the illumination feedback information;
    wherein the generating the illumination feedback information indicating the illumination effect of the video communication conference place comprises:
    obtaining an image of the video communication conference place shot by an image shooting apparatus; and generating the illumination feedback information according to the image;
wherein the generating the illumination feedback information according to the image comprises:
obtaining a parameter denoting brightness of the image, when determining that the parameter denoting brightness of the image is greater than a first threshold, generating a parameter indicating excessively strong illumination or a parameter indicating reduction of lighting illuminance; and when determining that the parameter denoting brightness of the image is smaller than a second threshold, generating a parameter indicating excessively weak illumination or a parameter indicating increase of the lighting illuminance;
or,
determining whether a color shift occurs in a background color of the image, and if yes, determining an illumination flaw causing the color shift occurring in the background color of the image, and generating a parameter indicating the illumination flaw or a parameter indicating correction of the illumination flaw;
or,
extracting a character image from the image, and determining whether a color shift occurs in a character skin color in the character image, and if yes, determining an illumination flaw causing the color shift occurring in the character skin color, and generating a parameter indicating the illumination flaw or a parameter indicating correction of the illumination flaw;
or,
determining whether a noise exists in the image, and if yes, determining an illumination flaw causing the noise, and generating a parameter indicating the illumination flaw or a parameter indicating correction of the illumination flaw.

2. The method according to claim 1, wherein the obtaining the image of the video communication conference place shot by the image shooting apparatus comprises:
obtaining, by a local terminal through a remote terminal, an image of a remote video communication conference place shot by a remote image shooting apparatus; and
the outputting the illumination feedback information comprises:
transmitting, by the local terminal through the remote terminal, the illumination feedback information to a remote lighting controlling device.

3. The method according to claim 1, wherein
the generating the illumination feedback information indicating the illumination effect of the video communication conference place comprises:
obtaining a result of detection performed by an illumination sensor on the lighting in the video communication conference place; and
generating the illumination feedback information according to the detection result.

4. The method according to claim 1, further comprising:
after detecting that a local microphone receives a voice of a local spokesman, sending, by a local terminal, first instruction information to a local lighting controlling device, wherein the first instruction information is used to instruct the local lighting controlling device to highlight the local spokesman by using illumination;
or,
after receiving indication information that is sent by a remote terminal and denotes that a remote microphone receives a voice of a remote spokesman, sending, by the local terminal, second instruction information to a remote lighting controlling device through the remote terminal, wherein the second instruction information is used to instruct the remote lighting controlling device to highlight the remote spokesman by using illumination;
or,
after detecting that the remote microphone receives a voice of the remote spokesman, sending, by the local terminal, second instruction information to the remote lighting controlling device through the remote terminal, wherein the second instruction information is used to instruct the remote lighting controlling device to highlight the remote spokesman by using illumination.

5. An apparatus for controlling a video communication conference place environment, comprising:
a generating unit, configured to generate illumination feedback information indicating an illumination effect of a video communication conference place, wherein the illumination feedback information comprises: a parameter indicating an illumination flaw or a parameter indicating correction of the illumination flaw;
a sending unit, configured to output the illumination feedback information, wherein the illumination feedback information is a basis on which a lighting controlling device in the video communication conference place controls lighting of the video communication conference place; and
wherein the generating unit is configured to obtain a parameter denoting a predetermined characteristic of an image, and when the generating unit determines that the parameter denoting the predetermined characteristic of the image is greater than a first threshold, the generating unit generates a parameter indicating an excessively strong predetermined characteristic or a parameter indicating a reduction of the predetermined characteristic; and when the generating unit determines that the parameter denoting the predetermined characteristic of the image is smaller than a second threshold, the generating unit generates a parameter indicating an excessively weak predetermined characteristic or a parameter indicating an increase of the predetermined characteristic.

6. The apparatus according to claim 5, wherein
the generating unit comprises:
an image obtaining subunit, configured to obtain the image of the video communication conference place shot by an image shooting apparatus; and
an illumination feedback information generating subunit, configured to generate the illumination feedback information according to the image obtained by the image obtaining subunit.

7. The apparatus according to claim 6, wherein
the image obtaining subunit is specifically configured to receive an image of a remote video communication conference place shot by the image shooting apparatus and sent by a remote terminal; and
the sending unit is specifically configured to output the illumination feedback information to the remote terminal.

8. The apparatus according to claim 6, wherein
the illumination feedback information generating subunit comprises at least one of the following: an illumination contrast check subunit, an image shooting noise point check subunit, an image shooting color shift check subunit and a character skin color check subunit, wherein,
the illumination contrast check subunit is configured to obtain a parameter denoting brightness of the image, when determining that the parameter denoting brightness of the image is greater than a first threshold, generate a parameter indicating excessively strong illumination or a parameter indicating reduction of lighting illuminance; and when determining that the parameter denoting brightness of the image is smaller than a second threshold, generate a parameter indicating excessively weak illumination or a parameter indicating increase of the lighting illuminance;

the image shooting color shift check subunit is configured to determine, according to the image, whether a color shift occurs in a background color of the image, and if yes, determine an illumination flaw causing the color shift occurring in the background color, and generate a parameter indicating the illumination flaw or a parameter indicating correction of the illumination flaw;

the character skin color check subunit is configured to extract a character image from the image, and determine whether a color shift occurs in a character skin color in the character image, and if yes, determine an illumination flaw causing the color shift occurring in the character skin color, and generate a parameter indicating the illumination flaw or a parameter indicating correction of the illumination flaw; and the image shooting noise point check subunit is configured to determine whether a noise exists in the image, and if yes, determine an illumination flaw causing the noise, and generate a parameter indicating the illumination flaw or a parameter indicating correction of the illumination flaw.

9. The apparatus according to claim 5, wherein the generating unit comprises:

a detection result obtaining subunit, configured to obtain a result of detection performed by an illumination sensor on the lighting in the video communication conference place; and an illumination feedback information generating subunit, configured to generate the illumination feedback information according to the detection result.

10. The apparatus according to claim 5, wherein the apparatus further comprises:

a detection unit, configured to detect whether a local microphone receives a voice of a local spokesman, or detect whether a remote microphone receives a voice of a remote spokesman; and the sending unit is further configured to, after the detection unit detects that the local microphone receives a voice of the local spokesman, send first instruction information to a local lighting controlling device, wherein the first instruction information is used to instruct the local lighting controlling device to highlight the local spokesman by using illumination; and, after the detection unit detects that the remote microphone receives a voice of the remote spokesman, send second instruction information to a remote terminal, wherein the second instruction information is used to instruct a lighting controlling device of the remote terminal to highlight the remote spokesman by using illumination;

or, the apparatus further comprises:

an obtaining unit, configured to obtain indication information that is sent by the remote terminal and denotes that the remote microphone receives a voice of the remote spokesman; and the sending unit is further configured to, after the obtaining unit obtains the indication information, send second instruction information to the remote terminal, wherein the second instruction information is used to instruct the remote lighting controlling device to highlight the remote spokesman by using illumination.

* * * * *